United States Patent
Lurey et al.

(10) Patent No.: US 10,708,237 B2
(45) Date of Patent: Jul. 7, 2020

(54) SYSTEM AND METHOD FOR CHAT MESSAGING IN A ZERO-KNOWLEDGE VAULT ARCHITECTURE

(71) Applicant: Keeper Security, Inc., Chicago, IL (US)

(72) Inventors: Craig B. Lurey, El Dorado Hills, CA (US); Darren S. Guccione, Chicago, IL (US)

(73) Assignee: KEEPER SECURITY, INC., Chicago, IL (US)

( * ) Notice: Subject to any disclaimer, the term of this patent is extended or adjusted under 35 U.S.C. 154(b) by 318 days.

(21) Appl. No.: 15/464,962

(22) Filed: Mar. 21, 2017

(65) Prior Publication Data
US 2018/0278585 A1 Sep. 27, 2018

(51) Int. Cl.
H04L 29/06 (2006.01)
H04L 12/58 (2006.01)
H04L 9/32 (2006.01)
H04L 9/08 (2006.01)

(52) U.S. Cl.
CPC ........ *H04L 63/0428* (2013.01); *H04L 9/0894* (2013.01); *H04L 9/3218* (2013.01); *H04L 51/04* (2013.01); *H04L 51/16* (2013.01); *H04L 2463/121* (2013.01)

(58) Field of Classification Search
CPC .............................. H04L 9/14; H04L 63/045
See application file for complete search history.

(56) References Cited

U.S. PATENT DOCUMENTS

| | | | | |
|---|---|---|---|---|
| 6,292,895 B1* | 9/2001 | Baltzley | ............... | G06F 21/00 380/255 |
| 7,058,696 B1* | 6/2006 | Phillips | ............... | G06F 16/10 709/217 |
| 2004/0096055 A1* | 5/2004 | Williams | ............ | H04L 9/3263 380/1 |
| 2007/0258584 A1* | 11/2007 | Brown | ............... | H04L 9/0819 380/43 |

(Continued)

OTHER PUBLICATIONS

Skype "Can I sync my Skype instant messages across devices" Sep. 2014, pp. 1-4, https://web.archive.org/web/20140922171527/https://support.skype.com/en/faq/FA12368/can-i-sync-my-skype-instant-messages-across-devices (Year: 2014).*

(Continued)

*Primary Examiner* — Techane Gergiso
(74) *Attorney, Agent, or Firm* — Klintworth & Rozenblat IP LLP

(57) ABSTRACT

A system and/or method includes facilitating secured chat messaging. An application module can derive a master password-based encryption key from a master password. The application module can generate a data key and encrypt the data key with the master password-based encryption key. The application module can generate a record key for encrypting chat messages of a chat thread and encrypt the record key with the data key. The application module can decrypt the chat messages in the chat thread with the record key, where the record key is decrypted with the data key, and where the data key is decrypted with the master password-based encryption key. The application module can display the decrypted chat messages.

17 Claims, 24 Drawing Sheets

(56) References Cited

U.S. PATENT DOCUMENTS

| | | | | |
|---|---|---|---|---|
| 2009/0228714 A1* | 9/2009 | Fiske | .................... | G06F 21/32 |
| | | | | 713/186 |
| 2009/0276621 A1* | 11/2009 | Matsuo | ................ | H04L 9/3236 |
| | | | | 713/155 |
| 2012/0036565 A1* | 2/2012 | Gamez | ................. | H04L 63/083 |
| | | | | 726/5 |
| 2016/0191442 A1* | 6/2016 | Penilla | ................... | H04L 51/22 |
| | | | | 709/206 |
| 2016/0277374 A1* | 9/2016 | Reid | .................... | H04L 63/101 |
| 2018/0013562 A1* | 1/2018 | Haider | ................... | G06F 21/14 |
| 2018/0115418 A1* | 4/2018 | Lakin | ................... | H04L 9/0863 |

OTHER PUBLICATIONS

Amazon, "AWS Key Management Service Concepts" Mar. 1, 2017, pp. 1-6, https://docs.aws.amazon.com/kms/latest/developerguide/concepts.html (Year: 2017).*

* cited by examiner

SYSTEM AND METHOD FOR CHAT MESSAGING IN A ZERO-KNOWLEDGE VAULT ARCHITECTURE

BACKGROUND

Instant messaging (IM) is a type of online chat that offers real-time text transmission over the Internet or a local area network. Short messages are typically transmitted bi-directionally between two parties, when each user chooses to complete a thought and select send. Some IM applications can use push technology to provide real-time text, which transmits messages character by character, as they are composed. More advanced instant messaging can add file transfer, clickable hyperlinks, voice over Internet protocol (IP), or video chat.

Several instant messaging applications are available, but today's known messaging applications are either not secure or they cannot operate over multiple devices with strong data retention. For example, most encrypted chat products use temporary one-time encryption keys for device-to-device chat, and the data is not available to other devices, or through device chat history. Also, chat messages on most traditional applications are stored in plain-text format which is not secure from unauthorized viewing.

SUMMARY

In one aspect, a system and/or method includes facilitating secured chat messaging. An application module can derive a master password-based encryption key from a master password. The application module can generate a data key and encrypt the data key with the master password-based encryption key. The application module can generate a record key for encrypting chat messages of a chat thread and encrypt the record key with the data key. The application module can decrypt the chat messages in the chat thread with the record key, where the record key is decrypted with the data key, and where the data key is decrypted with the master password-based encryption key. The application module can display the decrypted chat messages.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

DESCRIPTION

A system and method provide an encrypted, multi-platform messaging application for mobile and computer devices in a zero-knowledge security architecture. In some embodiments, an application module saves chat messages inside an encrypted vault so that any unauthorized person who has access to the device cannot access and view the messages. In some embodiments, the application module encrypts the messages, both at rest and in transit. In some embodiments, the application module can backup and restore the messages to protect the messages, e.g., in the event the device is lost, stolen, damaged or replaced. In some embodiments, the application module can provide a complete chat history to be displayed across multiple devices of a single account's platform. For example, the application module can provide synchronization of chat messages and history across smartphones, computers, tablets, etc. accessed by the single account. The application module can also utilizing chat thread-level encryption keys that are only decryptable by the users in the chat thread.

Figure 1:
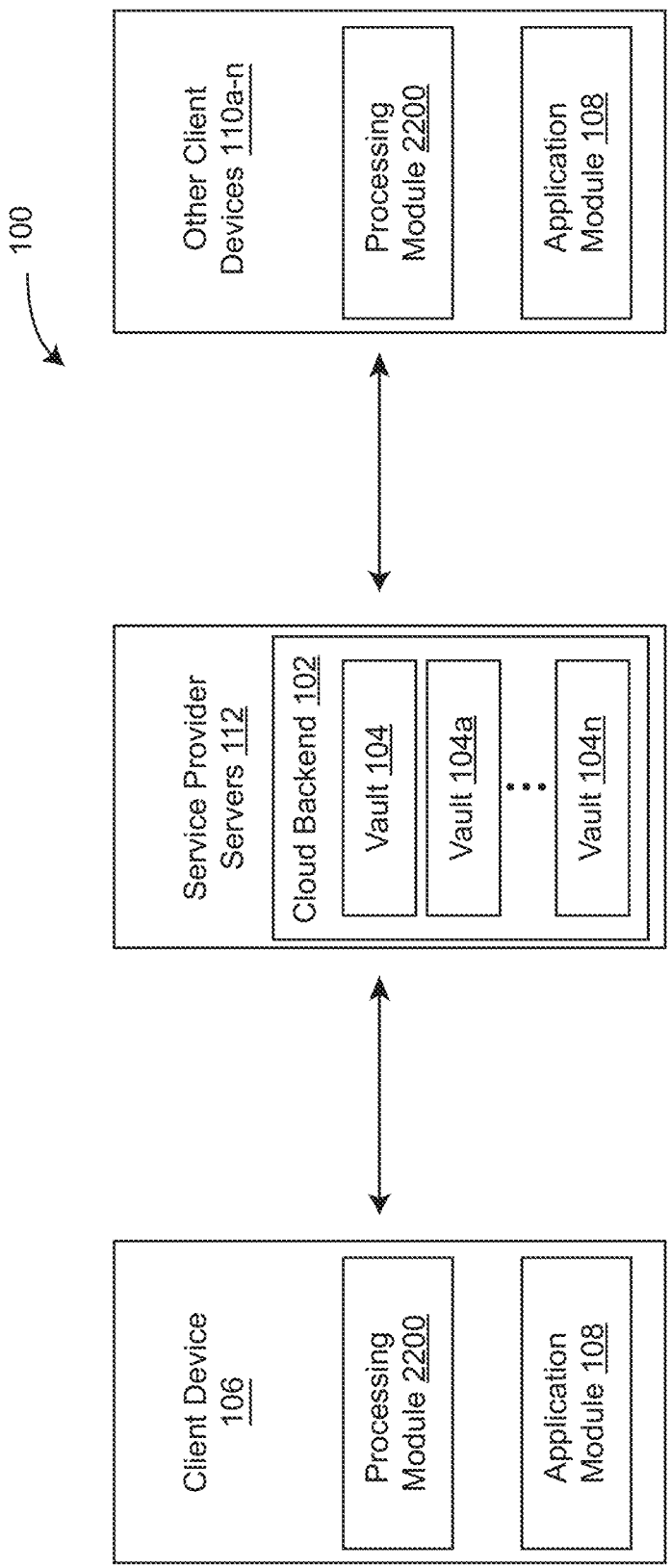
FIG. 1 is a block diagram of an example environment to provide chat messaging over devices in a zero-knowledge vault architecture.

FIG. 1 is a block diagram of an example environment to provide chat messaging to client-side devices 106 in a zero-knowledge vault architecture 100. In some embodiments, the zero-knowledge vault architecture can provide high level security and privacy by: 1) encrypting and decrypting at the client-side devices 106, not on the service provider servers 112; 2) not storing plain text, e.g., human readable, data; 3) receiving data at the service provider server 112 in plain text; 4) not allowing the provider to view unencrypted data; 5) deriving keys to decrypt and encrypt data from a master password of the device 106; 6) providing access control with multi-layer encryption at the device 106, group and administrative levels; and/or 7) sharing of data uses public key cryptography for secure key distribution. The device 106 encrypts data before transmitting and storing the data in the service provider vault 104. When data is synchronized to one or more other devices 110a-n, the data remains encrypted until it is decrypted on the other devices 110a-n.

For the sake of explanation, the zero-knowledge vault architecture 100 includes the client devices 106 performing chat messaging with other client devices 110a-n, e.g., by sending chat messages 360 to, and receive chat messages 360 from, the other client devices 110a-n. The devices 106 and 110a-n can include, but are not limited to, one or more of smartphones, computers, e.g., a personal computers (PC), desktop computers, laptop computers, tablets, smart watches, gaming consoles, televisions, personal digital assistants (PDAs), etc. A service provider provides an application module 108 to be stored locally on the devices 106 and 110a-n for encrypting and decrypting chat messages 360. For the sake of simplicity, the architecture is described as the device 106 sending messages to and receive messages from device 110a-n, and the devices 110a-n receiving messages from and sending messages to the device 106, but any combination of sending and receiving is possible. Sometimes the device 106 is referred to as a message sender device or initiating device, and device 110a-n as a message receiver device, but any of the devices 106 and 110a-n can send and receive chat messages 360, and the application modules 108 for the devices 106 and 110a-n encrypts and decrypts chat messages 360. In some embodiments, the application module 108 may be stored remotely from the devices 106 and 110a-n to be accessed by the devices 106 and 110a-n. For example, the application module 108 can be stored on a remote server and/or a cloud network, but not part of an infrastructure of the service provider servers 112.

Service provider servers 112 provide a backend 102 for the service providers that can be implemented as digital vault 104 corresponding to device 106 and digital vaults 104a-n corresponding to other devices 110a-n. The digital vaults 104 and/or 104a-n can be implemented as software applications hosted by the service provider's infrastructure, e.g. using a cloud or on-premise hosting provider, for storing encrypted chat messages 360 and encrypted keys as described in more detail below. In one example, the digital vaults 104 and 104a-n are hosted by an AMAZON Web Service (AWS), or other secure cloud services platform, which can provide compute power, database storage, content delivery and/or other functionality of the backend 102. The service provider servers 112 can use the digital vault 104 to securely store, protect, manage and/or share passwords, documents, digital assets, photos and other information, etc.

Figure 2:
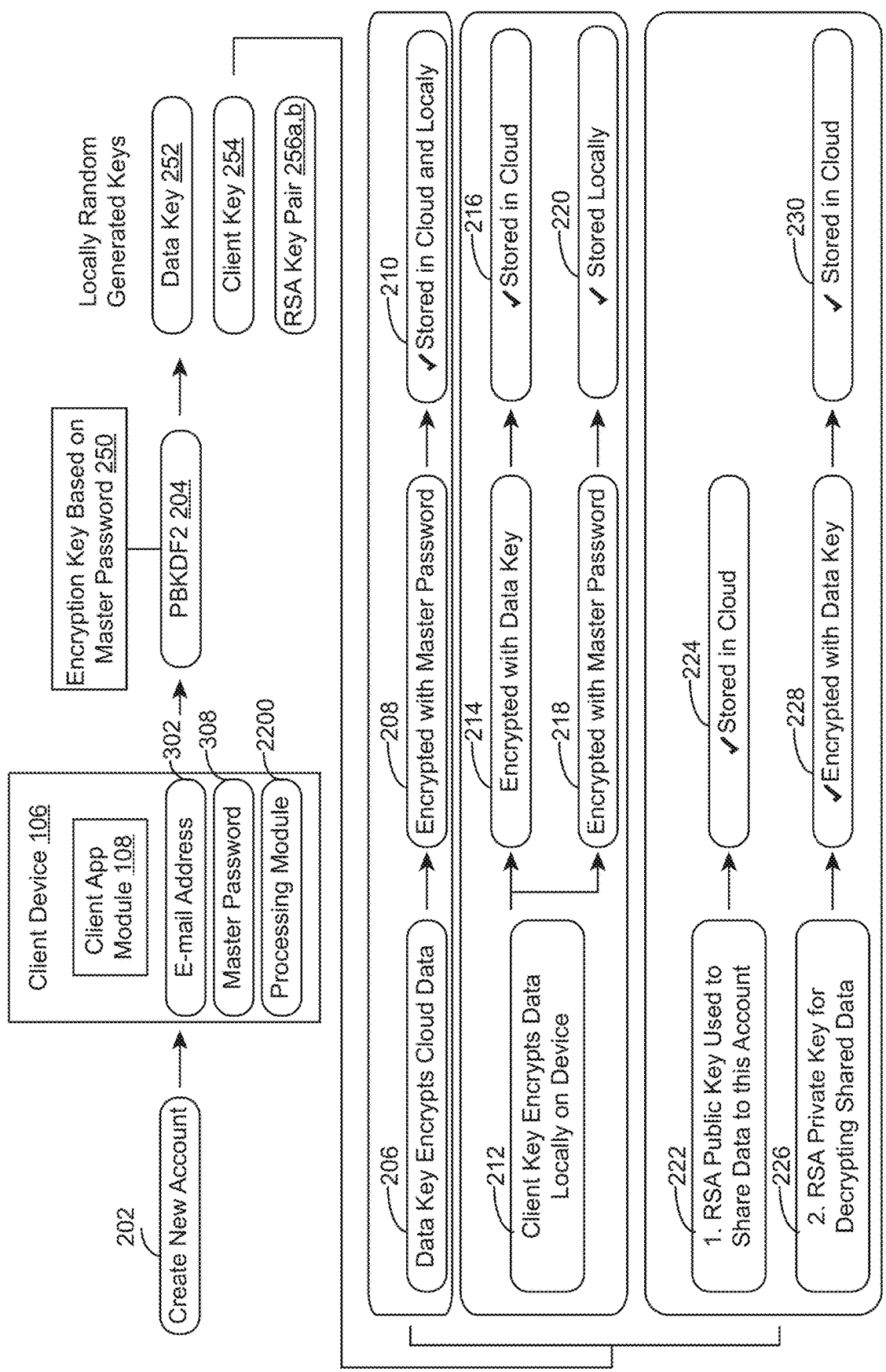
FIG. 2 is a flow diagram of an example architecture and processing of data for securely storing chat messages.

FIG. 2 is a flow diagram of an example architecture and processing of data for securely storing chat messages 360. To create a service provider account with the service provider, the device 106 is used to input an email address 302 and a master password 308 which are received by the application module 108 (202). The service provider account is identified by the email address 302, therefore the account can be used across multiple devices for the same user, e.g., smartphone, computer, tablet, etc. The application module 108 derives a master password-based encryption key 250 from the master password 308, e.g., using Password-Based Key Derivation Function 2 (PBKDF2), or other password-strengthening algorithm (204). The master password-based encryption key 250 remains the same for the user across all devices and for all chat threads by the user. In some embodiments, settings of the application module 108 can be changed to increase a number of PBKDF2 rounds for key derivation, e.g., 1,000, 10,000, or 100,000, etc., to adjust the level of encryption when accessing the digital vault 104. A higher iteration setting can increase the amount of time it takes for the device 106 to generate the master password-based encryption key 250 and authenticate into the vault 104 to decrypt, e.g. by a up to a few seconds. In any case, the time it takes for the device 106 to derive the master password-based encryption key 250 from the master password is purposely slow to make it unfeasible for all intents and purposes to crack the master password-based encryption key 250 with brute force attack. Likewise, it is unfeasible to brute force attack the encrypted data, since each individual record is encrypted with a unique 256-bit AES key, as described below.

To encrypt chat messages 360 for remote and local storage relative to the device 106, the application module 108 generates a data key 252 and client key 254, e.g., via a 256-bit Advanced Encryption Standard (AES), and public key/private key pair 256a,b, e.g., 2048-bit Rivest-Shamir-Adleman (RSA) key pair (208). Other types of cryptographic algorithms can be used to generate the data key 252 and client key 254. The application module 108 uses the data key 252 to encrypt data that is to be synchronized to the vault 104, e.g., chat message and key data, as a backup (206). For sake of explanation, the client device 106 is referred to but the same can apply for client devices 110a-n and vaults 104a-n. Before saving the data key 252 to the vault 104, the application module 108 encrypts the data key 252 with the master password-based encryption key 250 (208). The application module 108 stores the encrypted data key 252 and the data key encrypted data to the vault 104 and locally on the device 106 (210). The master password-based encryption key 250, which the device 106 derives from the master password on the fly, can be stored in a secure enclave of the device 106, if the device 106 has support for physical key storage that is only accessible by use of a fingerprint or other biometric, e.g. iOS Keychain.

The application module 108 uses the client key 254 to encrypt data that is stored locally on the device 106 (212). The application module 108 encrypts the client key 254 with the master password-based encryption key 250 (218) and stores the master password-based encrypted client key 254 locally on the device 106. For backup purposes, the application module 108 also encrypts the client key 254 with the data key 252 (214) and stores the data key encrypted client key 254 in the vault 104, e.g., as a backup if the device 106 is lost, stolen or replaced, etc. (216).

The public key/private key pair 256a,b are used by the application module 108 of other devices 110a-n to share chat messages 360 with the device 106, as described in more detail below. The application module 108 stores the public key 256a (222) to the vault 104 without encryption (224). The client device 110a-n uses the public key 256a to encrypt the data to share with the device 106. The application module 108 encrypts the private key 256b (226) with the data key 252 (228), and stores the encrypted private key 256b in the vault 104 (230). When the device 106 receives an indication of a new message being sent to it by the other devices 110a-n, the application module 108 uses the data key 252 to decrypt the private key 256b, and then the private key 256b to decrypt a record key 264 which is used to decrypt the data, as described in more detail below.

Figure 3:
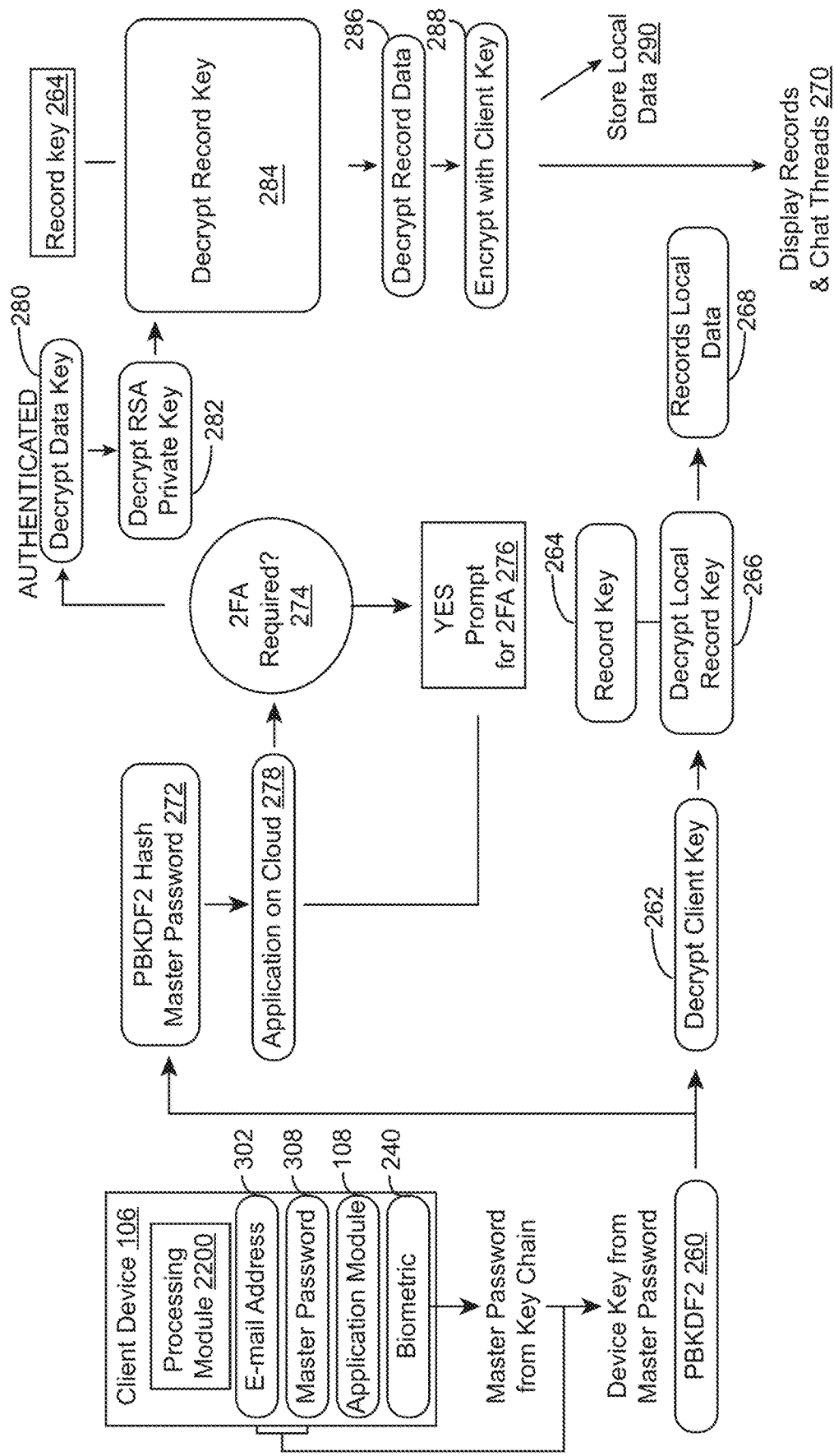
FIG. 3 is a flow diagram of an example architecture and processing of data for secure login and chat messaging.
Figure 4A:
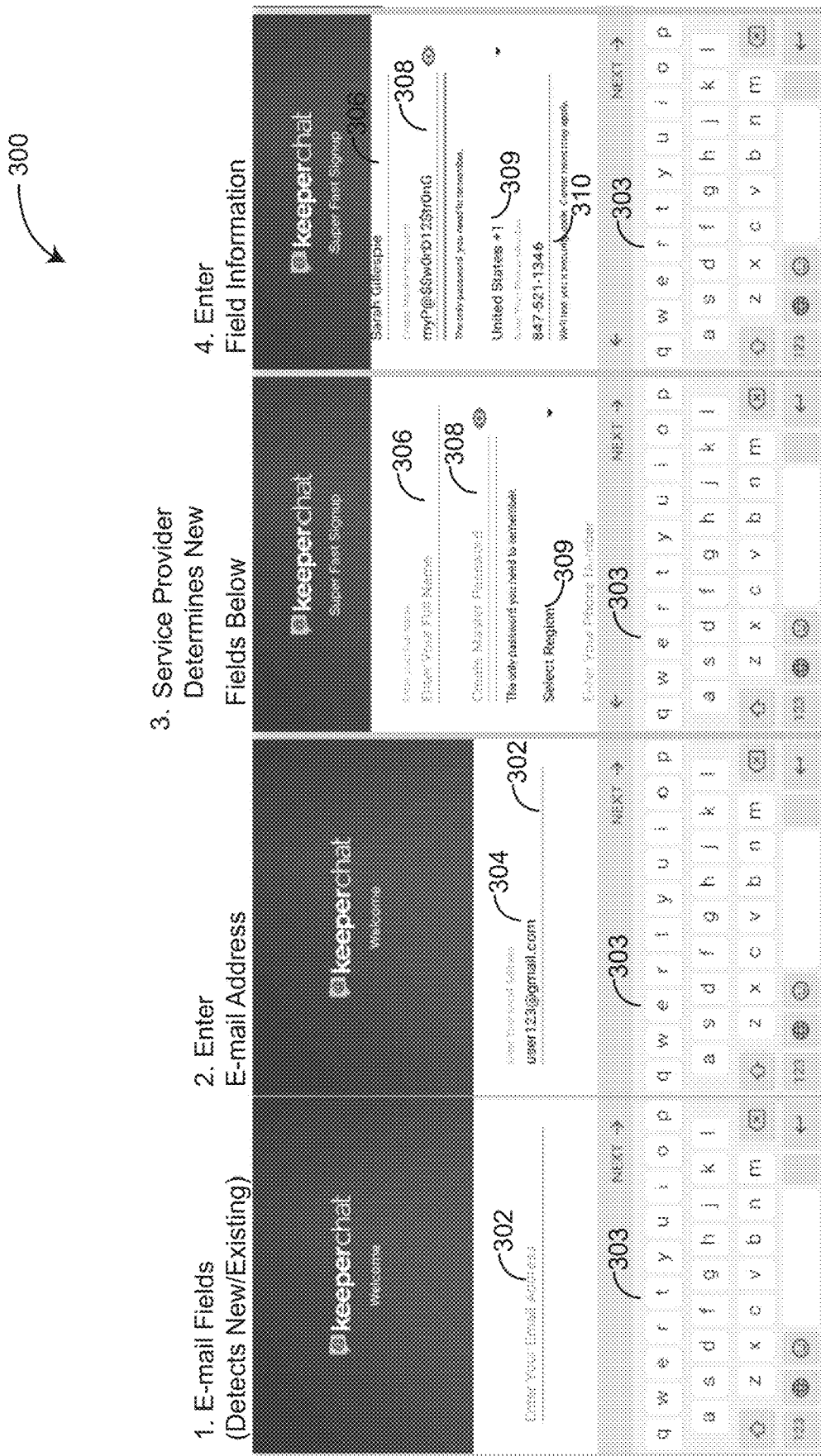
FIGS. 4-9 are screenshots of example signup and login architecture.
Figure 4B:
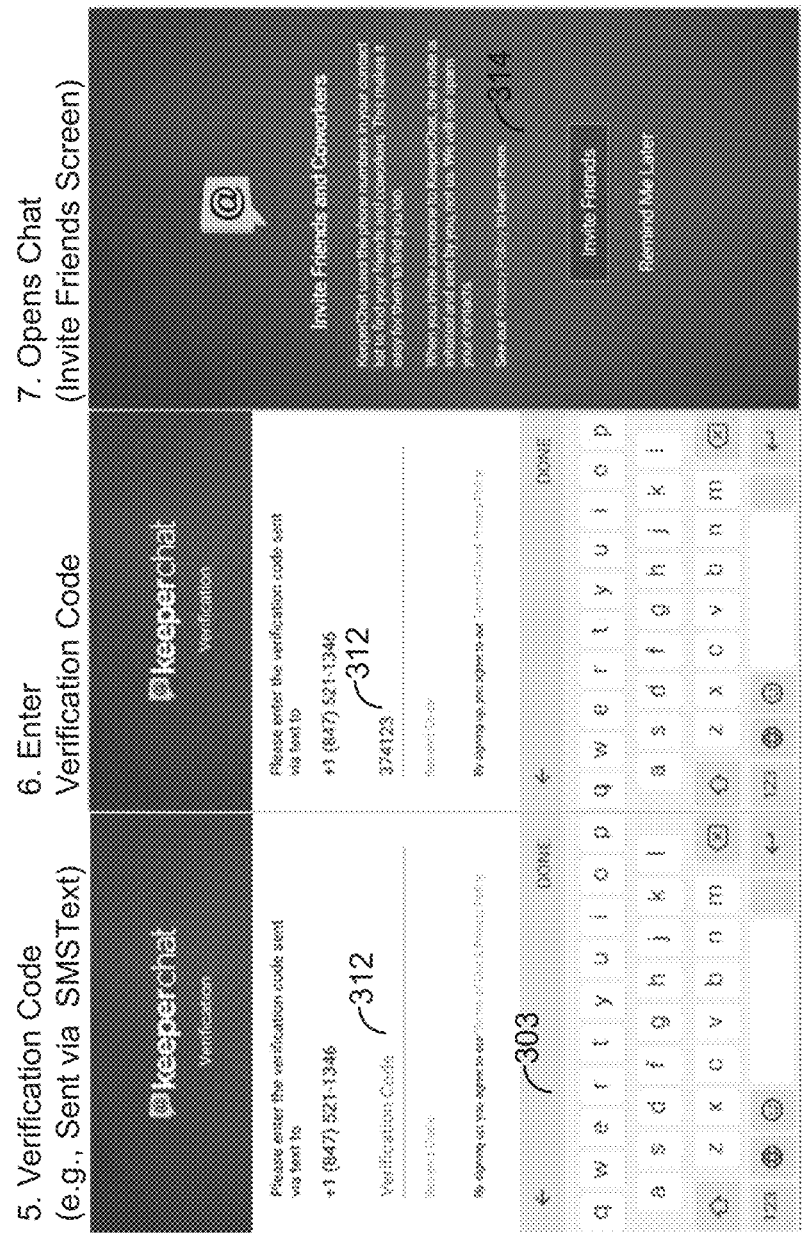

FIG. 3 is a flow diagram of an example architecture and processing of data for secure login and chat messaging of the device 106. The application module 108 generates the record key 264 for each chat message thread that is created by the device 106, e.g., a 256-bit AES key. The application module 108 uses the record key 264 to encrypt the record data corresponding to chat messaging, e.g., text, pictures, video, stickers, invited contacts, etc. For data stored local to the device 106, the application module 108 uses client key 254 to encrypt the record key 264 and stores the client key encrypted record key 264 locally to the device 106. The application module 108 also encrypts the record key 264 with the data key 252 and stores in the data key encrypted record key 264 and corresponding record key encrypted data in the vault 104, e.g., for backup.

The application module 108 can log in the device 106 using the email address 302, the master password 308 and/or a biometric 240, e.g., figure print, eye scan, etc. The application module 108 derives the master password-based encryption key 250 from the master password (260), and decrypts the locally stored client key 254 with the derived master password-based encryption key 250 (262). The application module 108 uses the decrypted client key 254 to decrypt a local record keys 264 (266). The application module 108 uses the record key 264 to decrypt the locally stored data, e.g., chat messaging and related, described in more detail below (268). The application module 108 can display the decrypted chat threads and record data on the device 106.

To sign in the device 106 into the provider's backend 102, e.g., to view chat messages 360 sent from other devices 110a-n and/or backup data stored on the backend 102, the application module 108 can authenticate the master password with a PBKDF2 hashing algorithm, or other password-strengthening security algorithm. When a device 110a-n sends a chat message to device 106, the device 106 can receive a short message service (SMS) message that a new chat messaging message has been sent to the device 106. The user can then sign in to the application module 108 to connect the device 106 with the service provider's backend 102. In some embodiments, the device 106 can connect with the service provider's backend 102 by the biometric 240, e.g., fingerprint, eye scan, etc., and/or master password 308. The application module 108 can also determine if multiple forms of identification are required for authentication, e.g., in addition to the master password or biometric 240 (274). If the application module 108 requires other forms of identification, the application module 108 can prompt the device 106 for another form of identification, e.g., a phone number 310 described below (276). In some embodiments, the device 106 supports various forms of two-factor authentication to further protect access to the digital vault 104, e.g., two or more of fingerprint authentication, e.g. APPLE Inc. TOUCHID, short message service (SMS), GOOGLE authenticator, authentication by DUO, SecurID, Apple Watch authentication, Android Wear authentication, etc. Once confirmed, the application module 108 authenticates the device 106 on the service provider's backend 102.

The application module 108 uses the derived master password-based encryption key 250 to decrypt the data key 252 stored in the vault 104 (280). When device 110*a* invites device 106 to the chat thread, the device 110*a* requests from the backend 102 the public key 256*a* for device 106. The application module 108 for device 110*a* encrypts the record key 264 for the chat thread with the received public key 256*a*, and synchronizes the encrypted record key 264 and corresponding record data with the vault 104 for the device 106. The application module 108 for device 106 uses the decrypted data key 252 to decrypt the private key 256*b* stored in the vault 104 (282), and decrypts the record key 264 with the private key 256*b* (284). The application module 108 can then decrypt the record data with the record key 264 (286), and display the decrypted records and chat threads (270).

For optimization, the application module 108 can then re-encrypt the record key 264 with the data key 252 for devices 106, e.g., since AES encryption can be faster than RSA encryption (288). The application module 108 can then store the client key encrypted record key 264 and encrypted data local to the device 106. Thereafter, when the device 106 logs in with the master password 308, the device 106 can decrypt the client key 254 with the master password-based encryption key 250, and decrypt the record key 254 with the client key 254, etc., as described above. In this way, the application module 108 can provide for secure chat messaging for consumer and/or business uses alike. The service provider's backend 102 employs a zero-knowledge security architecture, e.g., provided by KEEPER SECURITY, Inc. or other service provider, for which the device 106 always, not the service provider, has full knowledge and control of the master password 308 and the master password-based encryption key 250, all of which reside and/or operate locally on the device 106. The application module 108 can communicate with the digital vault 104 for encrypting, storing, organizing and protecting the chat messages 360 and message attachments, e.g. files, stickers, photos and videos, etc. on all devices 106 registered with the service provider via the email address, as described in more detail below.

Once the device 106 gains access to the digital vault 104 upon successful entry of the master password 308 and/or biometric 240, the device 106 can engage in private and secure messaging sessions with other devices 110*a-n* using the service provider's application module 108. Messaging is digital vault 104 to digital vault 104*a-n*, from one device 106 to other devices 110*a-n*. In some embodiments, new devices are onboarded to the application module 108 upon being invited by an existing device or by receiving a notification that they have received a private message from the service provider. To open a message for the first time, when the device 106 has not yet installed the application module 108 yet, the device 106 is onboarded onto the application module 108 as a new user. This creates a private, secure form of chat messaging.

FIGS. 4-9 are screenshots of example signup and login architecture. In FIGS. 4A-B, the application module 108 displays a login screen 300 on the device 106. The login screen 300 includes a field 302 for entering an email address 304 related to the user of the device 106. The email address 304 is entered by a user interface 2116 of the device 106 (FIG. 22), e.g., via a keyboard 303 of the device 106. If the application module 108 does not recognize the entered email address 304, the application module 108 provides a name field 306, master password field 308, region field 309 and telephone number field 310 for inputting the respective information. As another layer of security, the application module 108 can also send a verification code to the inputted telephone number 310 and provide a verification code 312 field for the user to enter the received verification code into the application module 108. When the device 106 is signed into the application module 108, the application module 108 can provide a button 314 for the device to invite friends.

Figure 5:
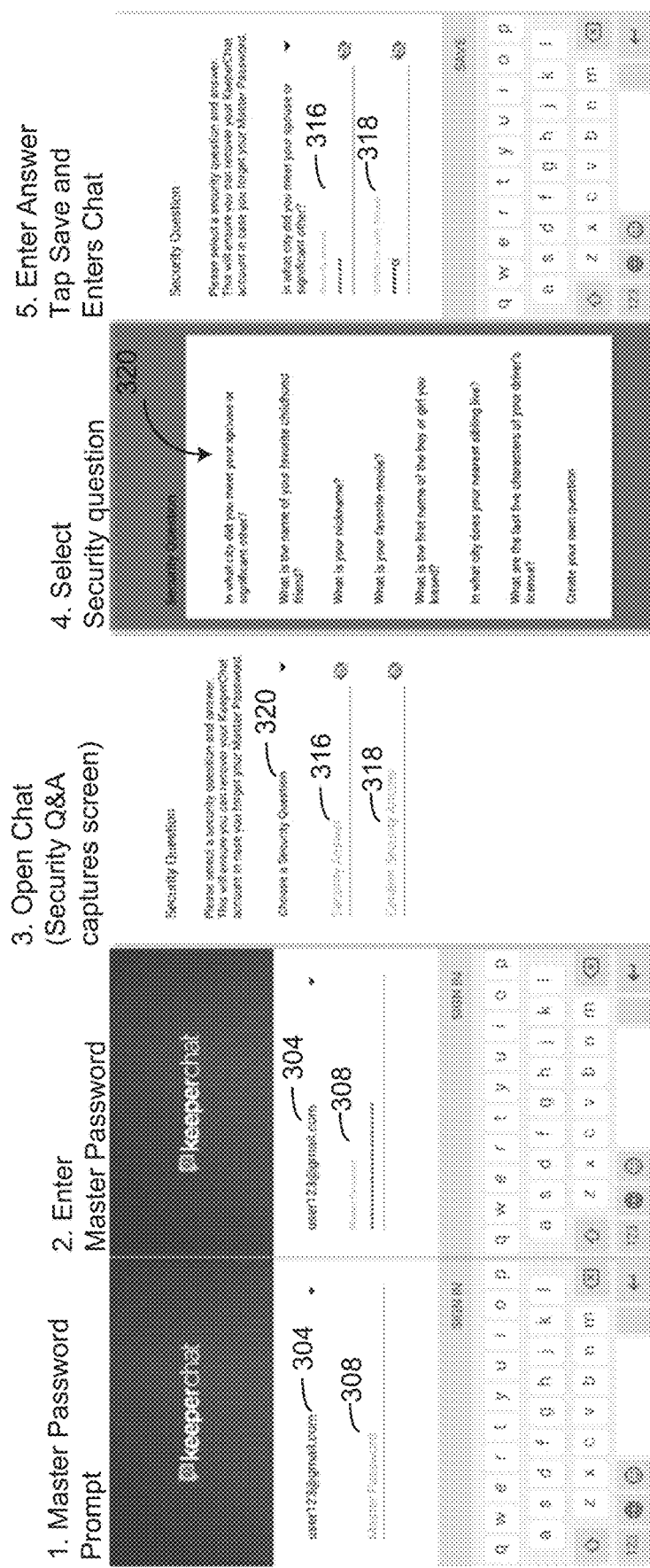

In FIG. 5, upon a subsequent login attempt to the user account associated with the email address 304, the application module 108 requests entry of the master password 308 into the field. The application module 108 can request that security answers be provided via security answer field 316 and confirm security answer field 318, related to chosen security question 320. Thereafter, the application module 108 can request the verification code 312 and/or answer to a security question 320 be entered on the device 106*a* when new devices 106*b-n* are first added to the user account associated with the email address 304. Additionally or alternatively, the application module 108 can request the verification code 312 and/or answer to the security question 320 be entered on the device 106*a* when an email address 304 of the user is new to the application 106 but known by the service provider, e.g., for other services of the service provider. In that case, the application module 108 can request a selected region 309 and entry of the telephone number 310 for sending a verification code 312. The application module 108 can request the master password 308 and answer 316 to the security question 320 before providing the button 314 to invite friends.

Figure 6:
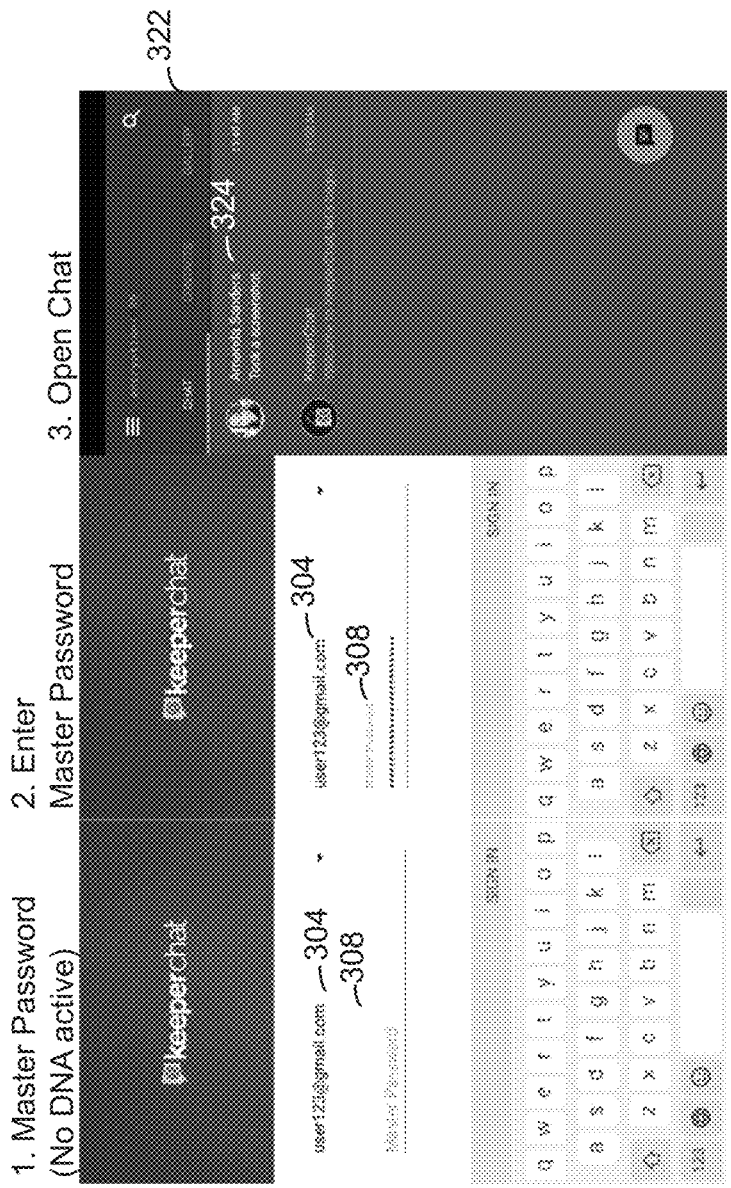
Figure 7:
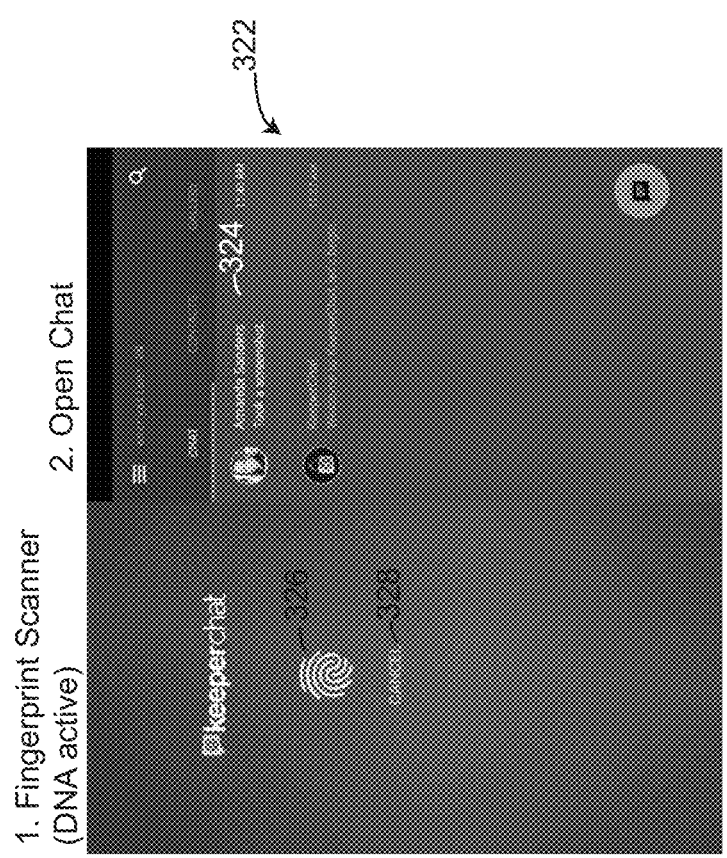
Figure 8:
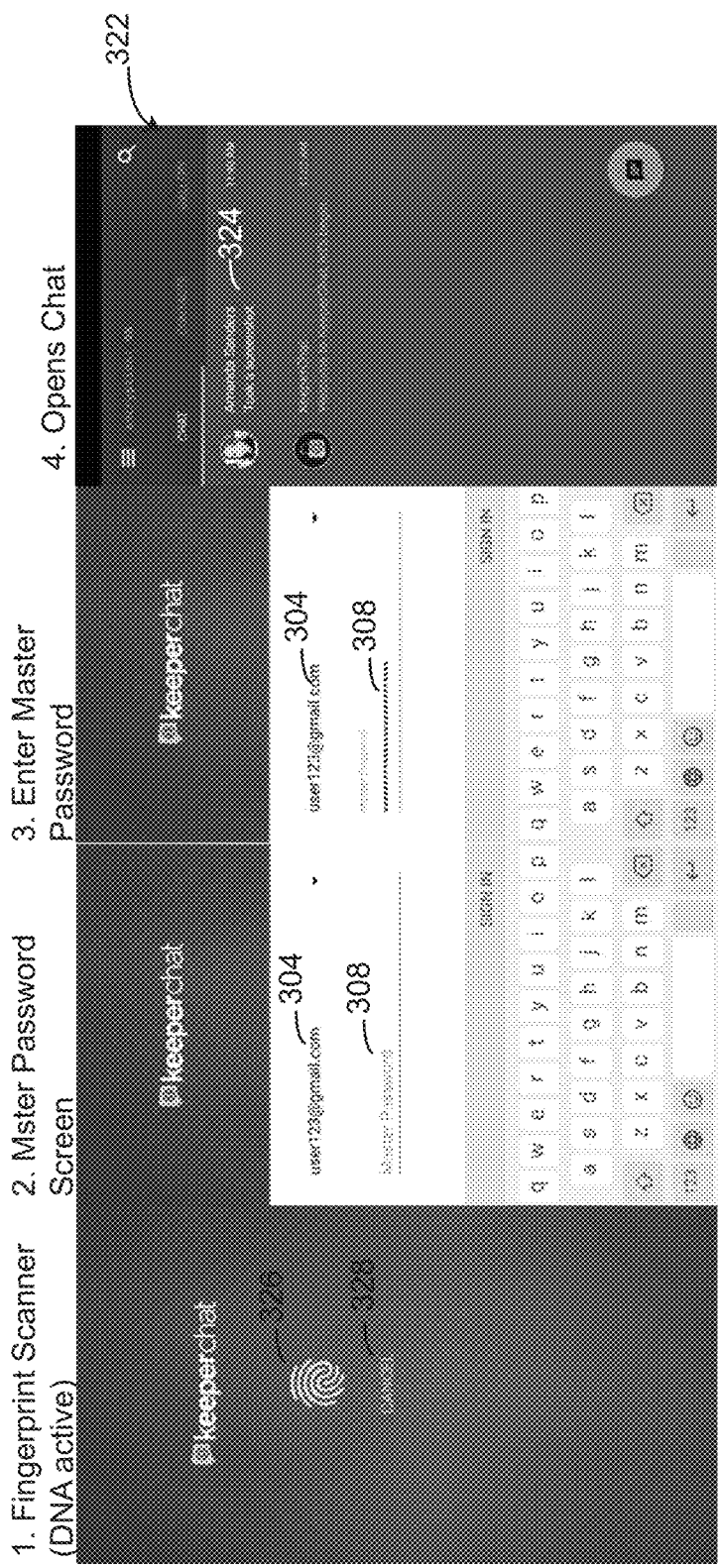

In FIG. 6, when a device 106 is registered with the application module 108, the application module 108 can request the user's email address 304 and master password 308 to determine and display a user contact screen 322 that lists registered chat contacts 324 associated with the user's account. In FIG. 7, when the email address 304 is established with the application module 108 for the device 106, the application module 108 can be accessed with a fingerprint scan 326. Moreover, a cancel prompt 328 allows the fingerprint scan 326 to be bypassed. In FIG. 8, if the fingerprint scan 326 is bypassed, the application module 108 can prompt the user to enter the email address 304 and the master password 308 for the account to open the contact screen 322 of the application module 108.

Figure 9A:
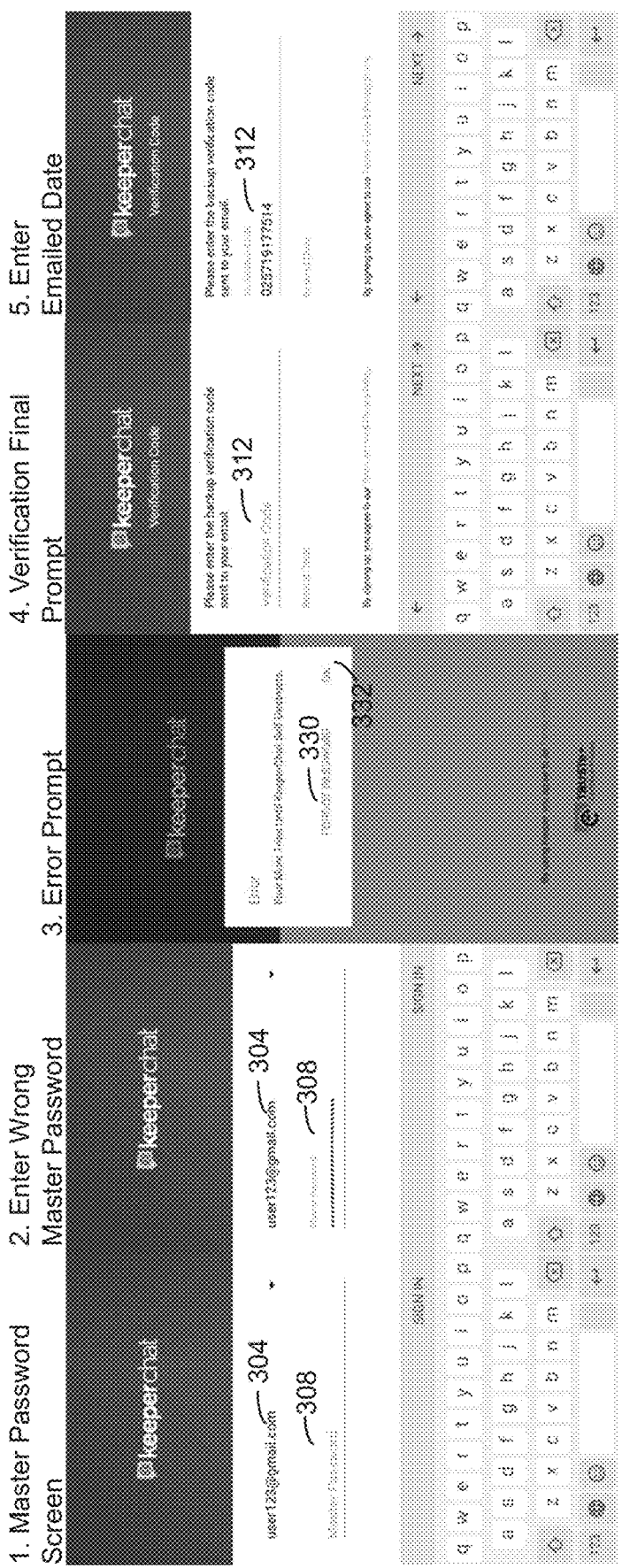
Figure 9B:
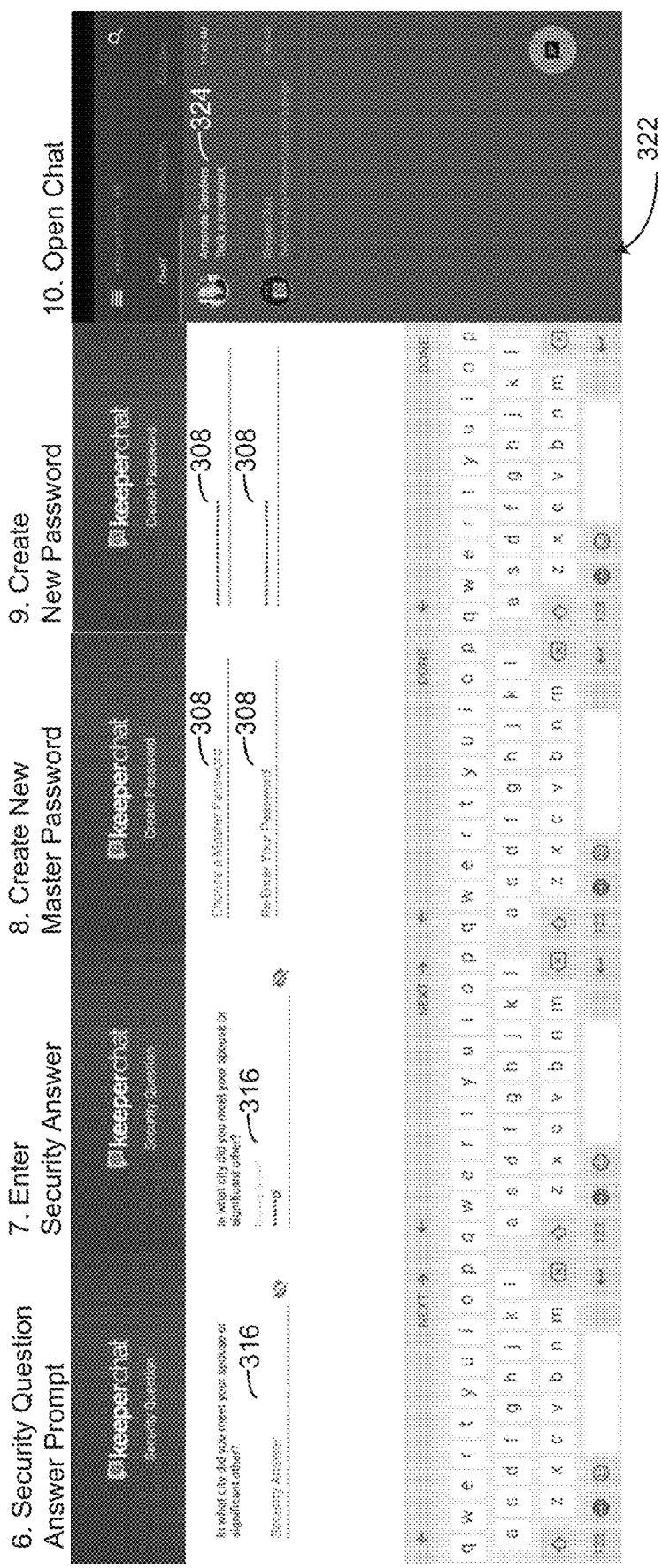

In FIGS. 9A-B, if the master password 308 is forgotten, or entered incorrectly more than a determined number of times, the application module 108 can display an error prompt 330. In some embodiments, the application module 108 includes a self-destruct protection to wipe all the data associated with the account from the vault 104, including all chat threads and keys, after a determined number of incorrect login attempts. When a third-party, such as a hacker, attempts to break into the device 106, the application module 108 deletes the data stored on the device 106, e.g., after a number of incorrect password attempts. The error prompt 330 can indicate that the application module 108 will destruct the chat messages 360 if an incorrect password is entered a determined number of more times. If the user regains control of the device 106, or obtains a replacement device, the application module 108 can restore data to the device 106, e.g., via encrypted data and encrypted keys stored in vault 104, upon successful re-authentication of the device 106.

For secure account recovery, e.g., in the event the user forgets the master password, the application module 108 can encrypt a second copy of the data key 252 with the selected security answer. Upon completion of a second factor authorization, answering the security question, and optionally completing a third factor of authentication, e.g. via SMS, the application module 108 decrypts the data key 252 on the client device 106. To accommodate recovery, the application module 108 can provide a forgotten password link 332. When the forgotten password link 332 is tapped/clicked, the application module 108 displays the field for the verification code 312 and sends a verification code to the telephone number 310 on record. If the verification code 312 is entered correctly to the device 106, the application module 108 requests the security answer 316. When the security answer 316 is answered correctly, the application module 108 prompts for entry of a new master password 308. Upon entry of the master password 308, the application module 108 displays the contact screen 322 on the device 106.

Figure 10:
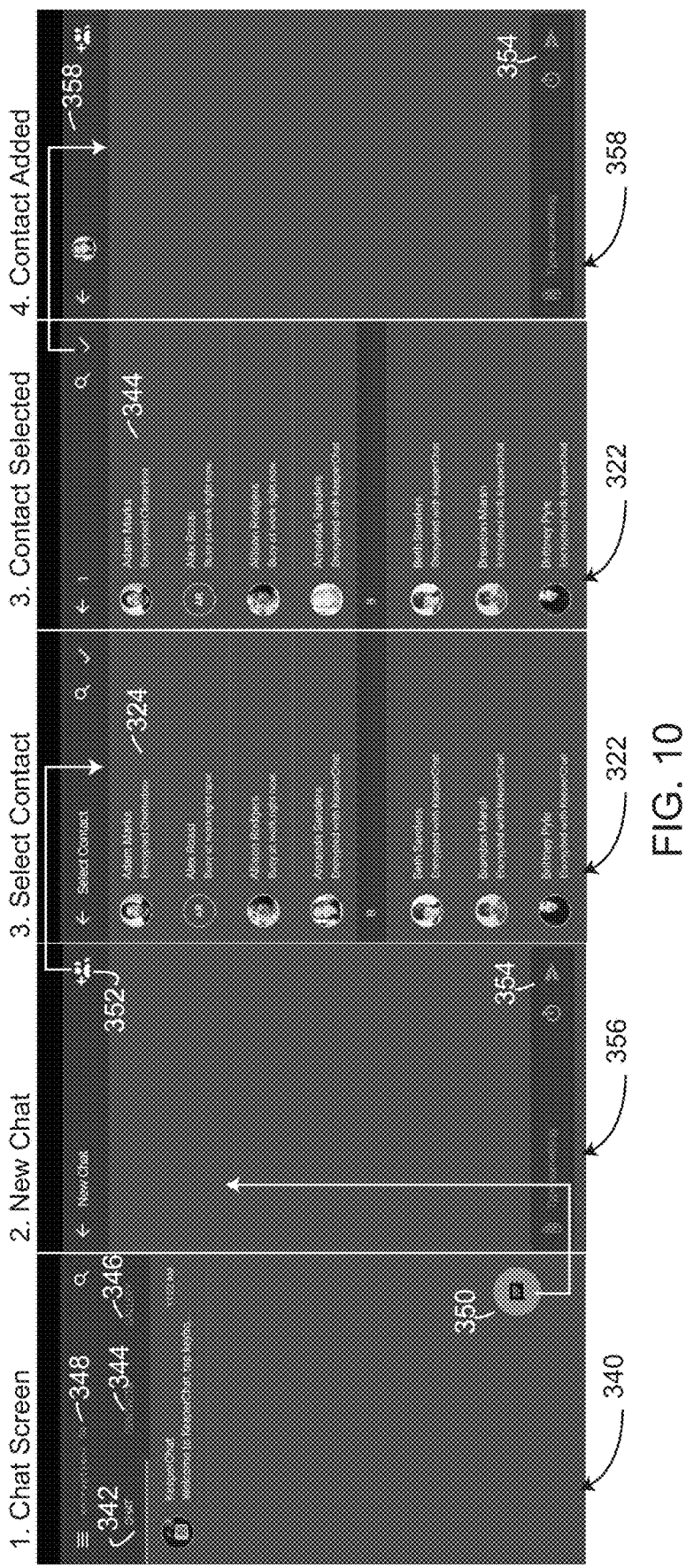
FIGS. 10-21 are screenshots of example messaging architecture via the application.
Figure 11:
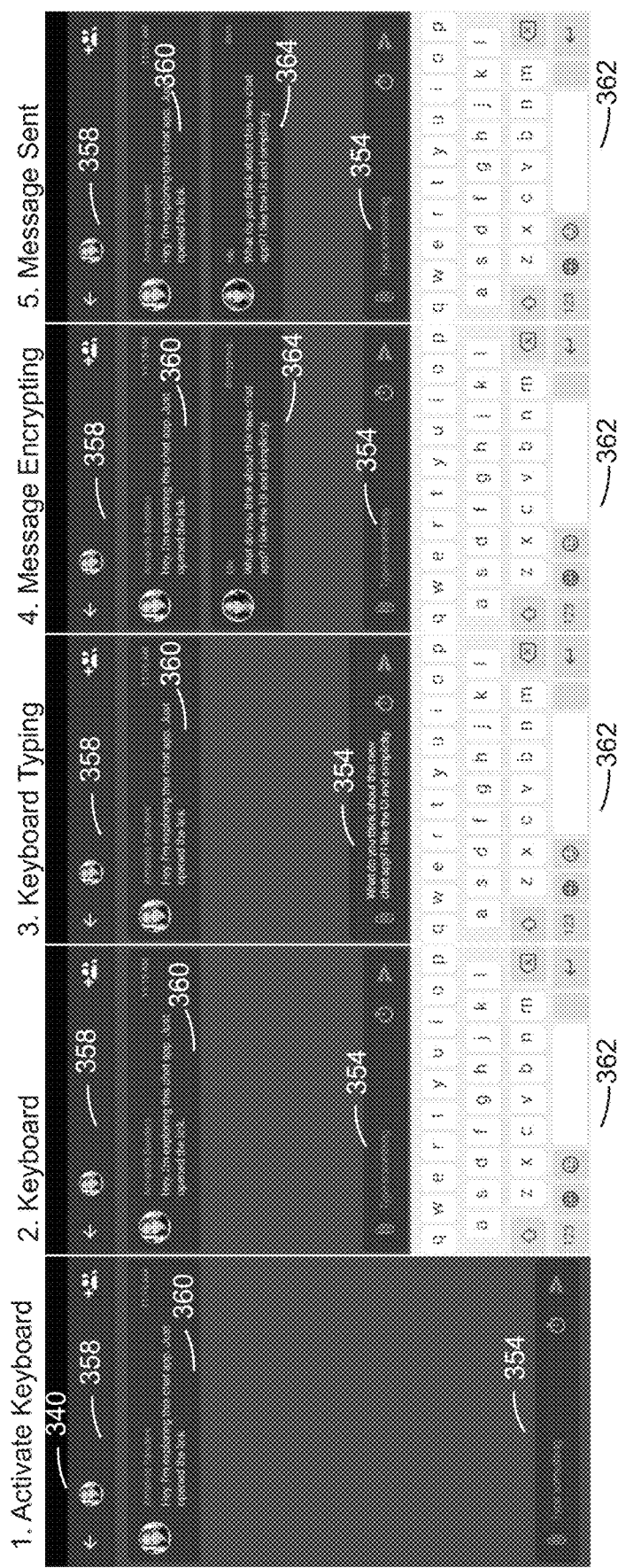
Figure 12:
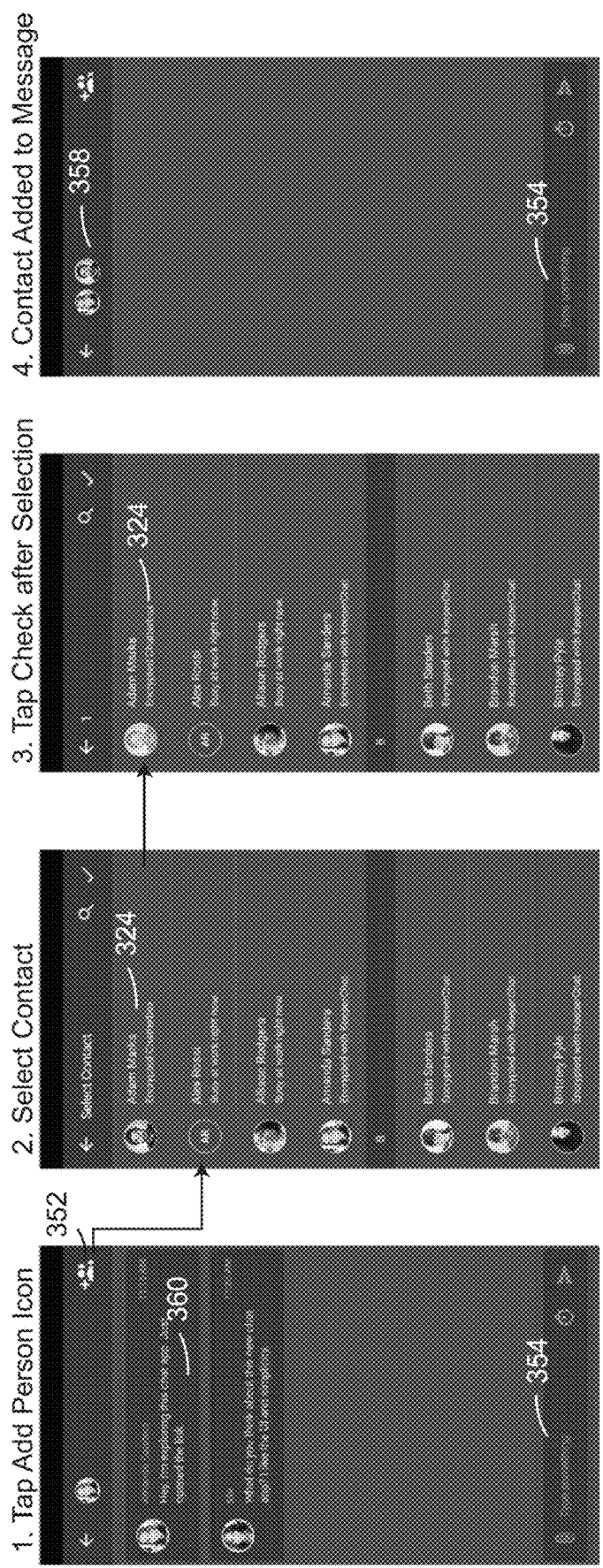
Figure 13:
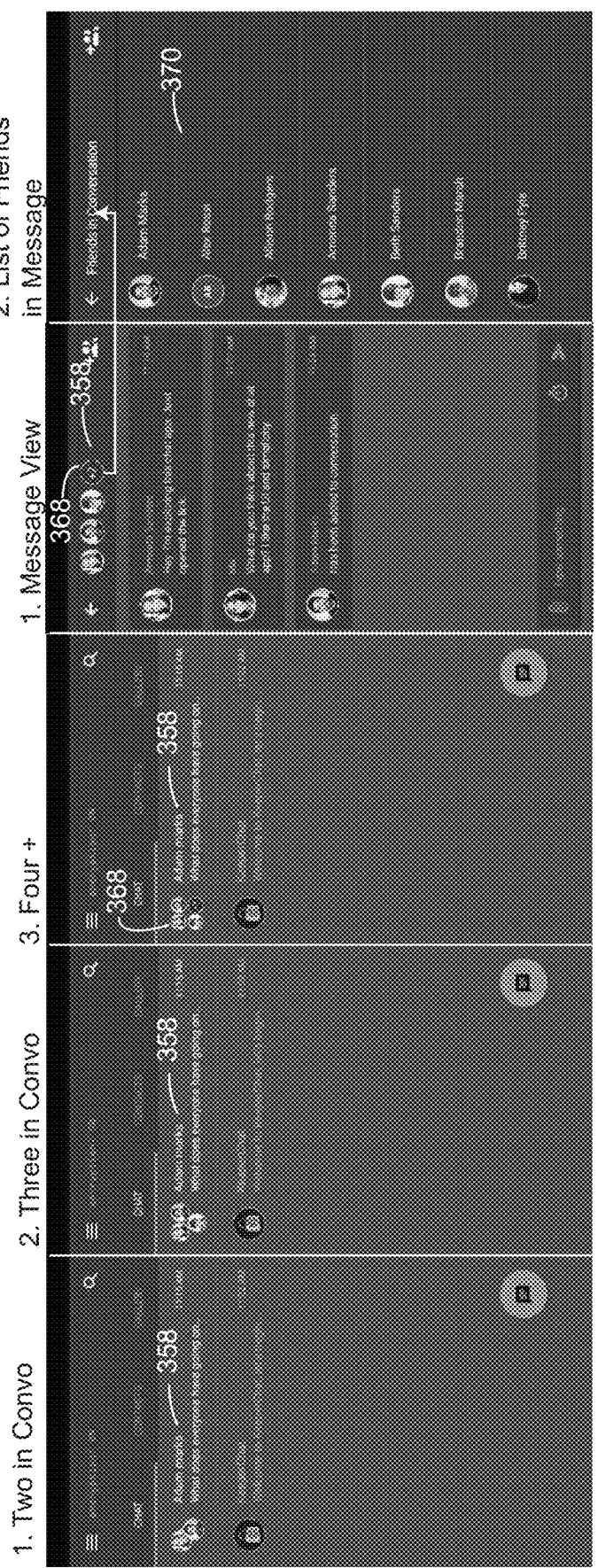

FIGS. 10-21 are screenshots of example messaging architecture via the application module 108. In FIG. 10, the chat screen 340 can include tabs for the device 106 to display chat functionality 342, contacts 344 and a gallery 346. All files 372, sent or received by the device 106, can be stored in the gallery 346. The files can include files stored on the device 106 and/or files stored remote from the device 106 but accessible by the device 106, including but not limited to photos, videos, other media, documents, etc. The application module 108 can provide an encryption on indicator 348, and an icon 350 can be tapped/clicked to compose a new chat message thread. The new chat message screen 356 can include an icon 353 for selecting a contact, e.g., from the list of contacts 324, to join to a chat message thread, and a field 354 for typing a message, adding an attachment, sending the message, etc. As contacts 324 are added to the chat message thread, they can be listed at the top of the screen 358. The application module 108 can also delete contacts 324 from the chat message thread, e.g., when the application 108 receives a long press on the contact 324. In FIG. 11, messages 360 can appear on the chat screen 340 as the device 160 sends and receives them. The application module 108 can provide the keyboard 303 displayed by the device 106 for entering messages 360. The message 360 can display an encrypting indicator 364 as the application module 108 encrypts the message and sending status information 366, e.g., when the application module 108 sent the message. In FIG. 12, the application module 108 can add new contacts to the message thread, e.g., by tapping/clicking button 352 to access the list of contacts 324, and then receiving a click/tap for the contact to add. The application module 108 can display the new contact at the top of the screen 358. In FIG. 13, the application module 108 can display a number icon 368 indicating that more than a determined number of contacts are part of the chat message thread. Additionally or alternatively, the application module 108 can display a list 370 of all the contacts on the thread.

Figure 14:
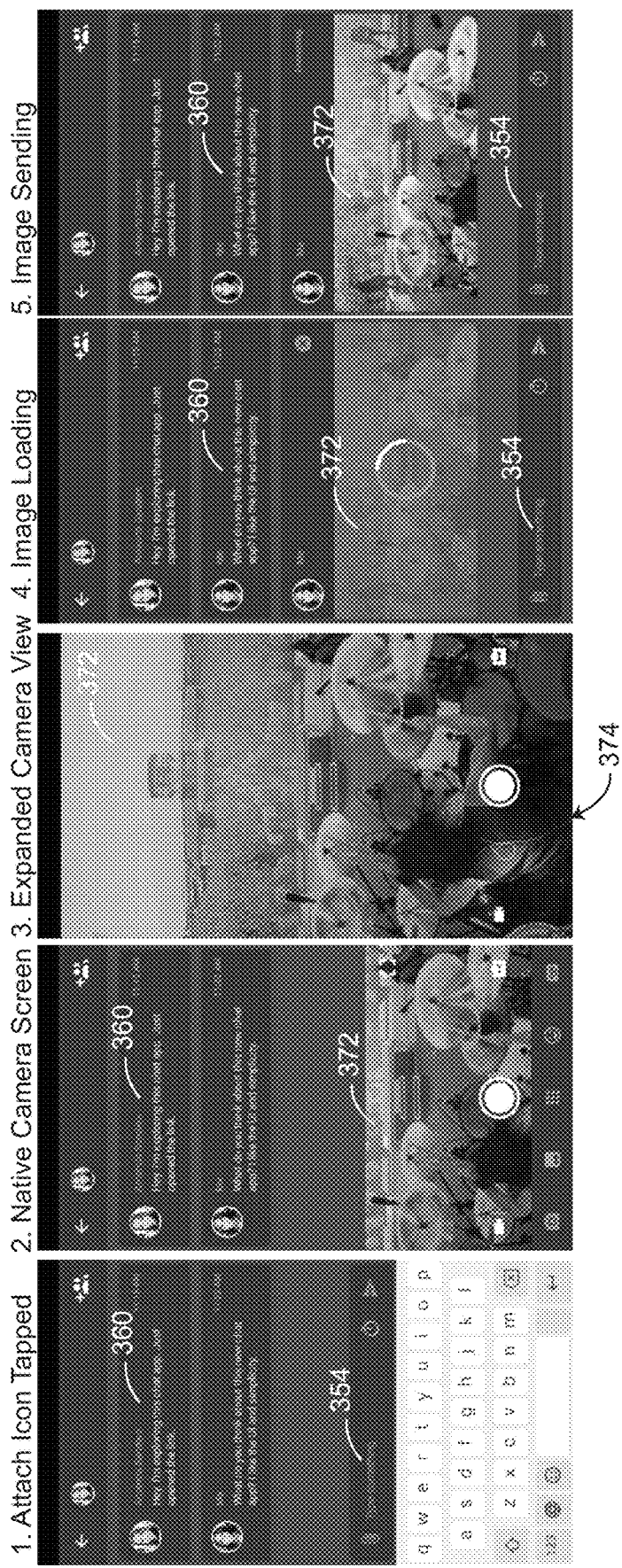
Figure 15:
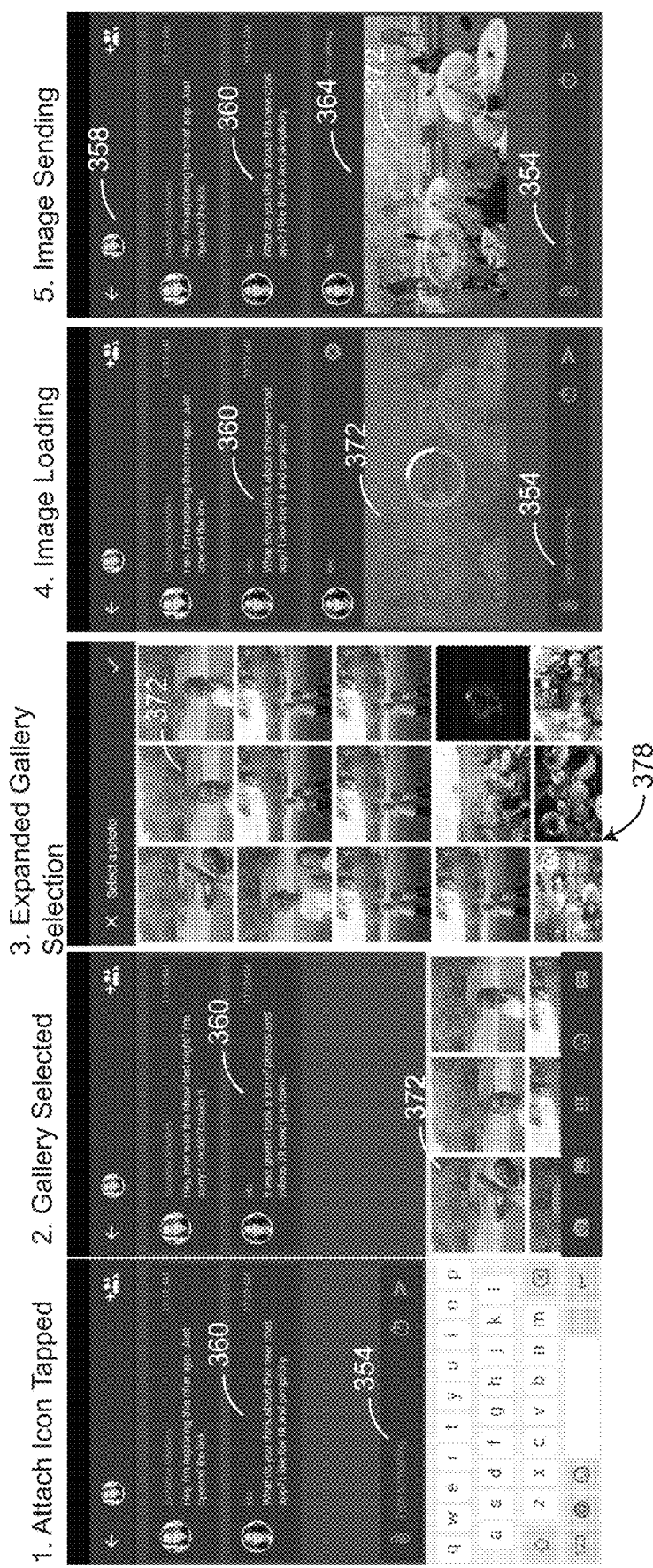
Figure 16:
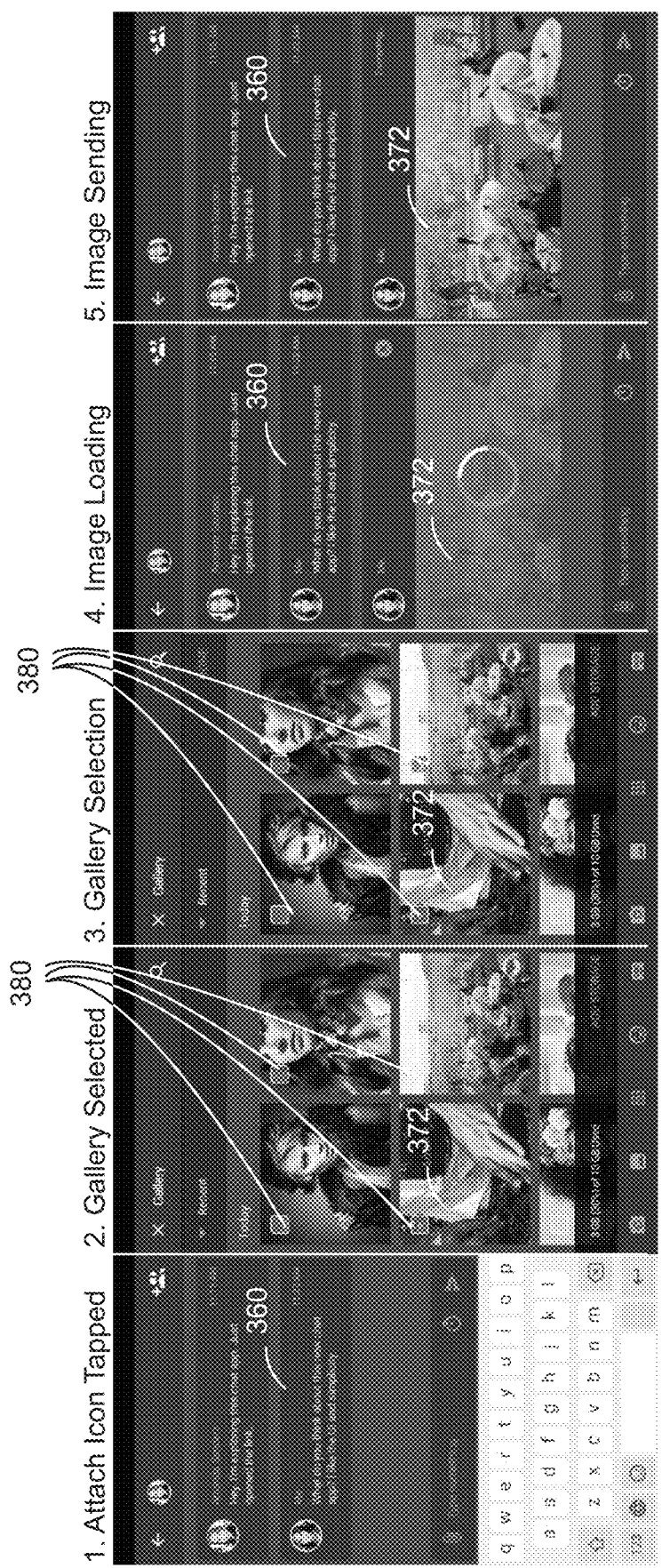
Figure 17:
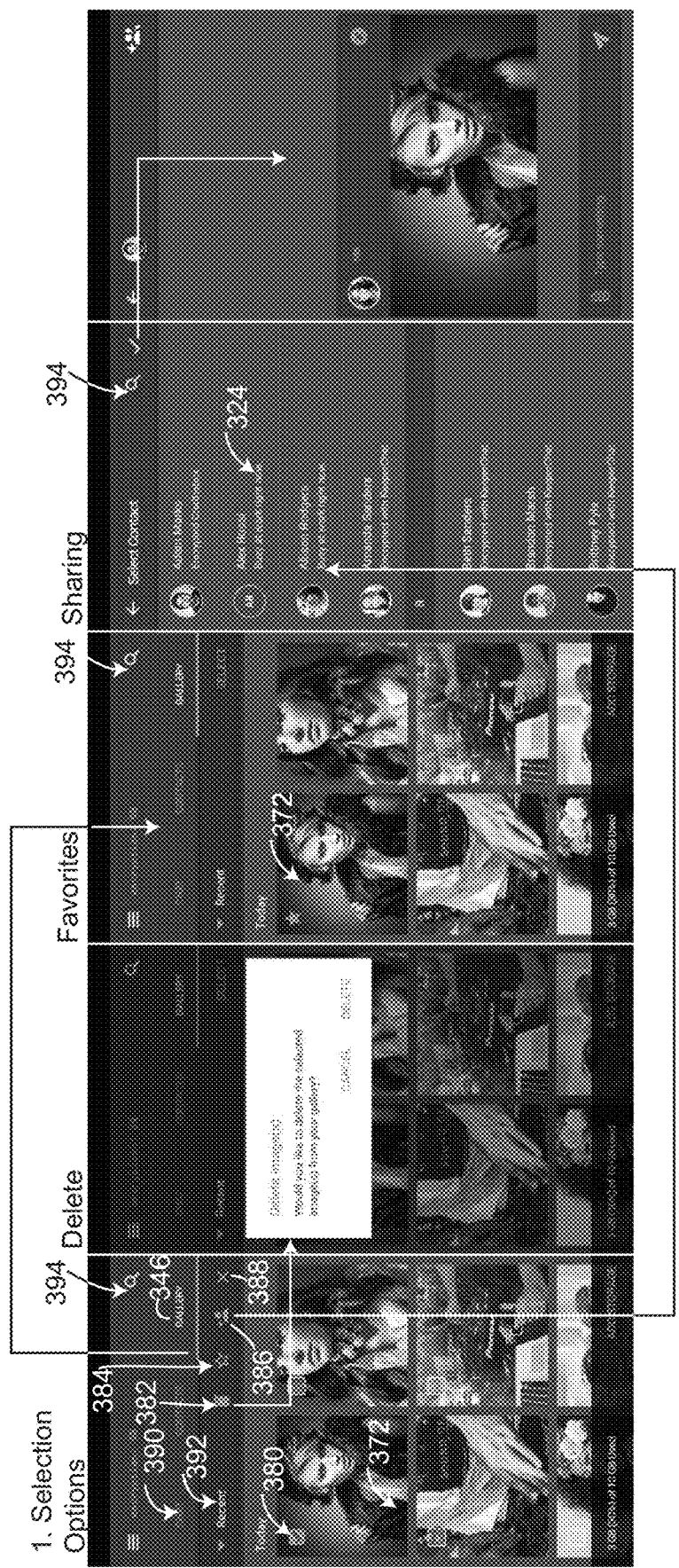

In FIG. 14, the application module 108 can attach selected files 372 to the chat messages 360. In some embodiments, the application module 108 provides an expanded camera view 374. From the camera view 374, the device 106 can receive a click/tap indicating to take a picture of the scene in the camera view 374. The application module 108 can attach the picture to chat message 360 and send the picture. In FIG. 15, the application module 108 can receive the file 372 from a camera roll. The application module 108 can provide an expanded view 378 of the gallery 346 for selection of a photo to attach to the chat message 360. The application module 108 attaches the photo to the chat message 360, encrypts the message, and then sends the message to the selected contact(s) listed at the top of the screen 358. In FIG. 16, the application module 108 can provide a selection box 380 for each file 372, to receive a selection of the file 372 to attach to the chat message 360. The application module 108 can provide sorting of the files 372 by date, e.g., recent or older, favorites, a dragged and dropped order, etc. In FIG. 17, a user interface 390 of the gallery 346 can include a delete icon 382, a favorites icon 384, a share icon 386 and a close icon 388, for the device 106 to delete files, show only files marked favorites and open the list of contacts 324 for sharing the file, respectively. The user interface 390 can also include a drop down menu 392 for sorting files 372 by recent, favorite, older, etc. In some embodiments, the application module 108 provides navigation from one file to the previous or next file by swiping the file displayed on the device 106. The application module 108 can also provide a search icon 394 to search for files 372 using text.

Figure 18:
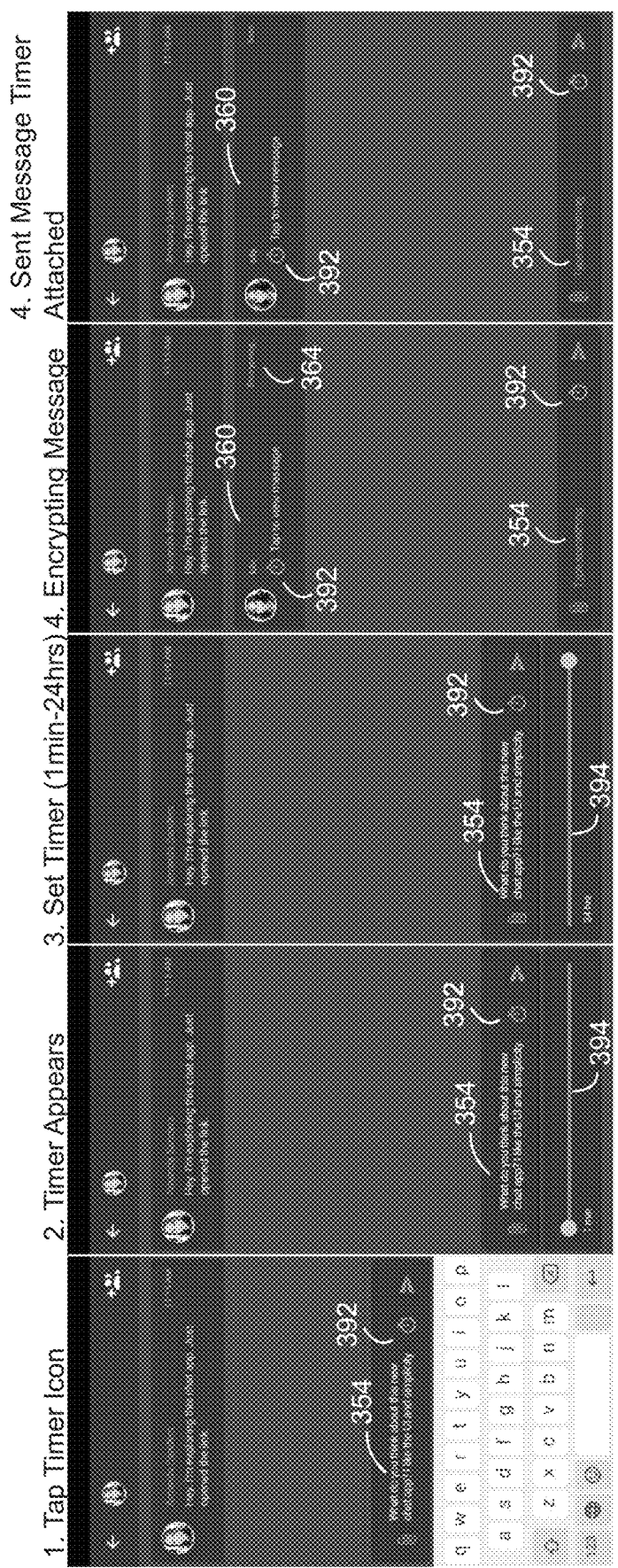
Figure 19:
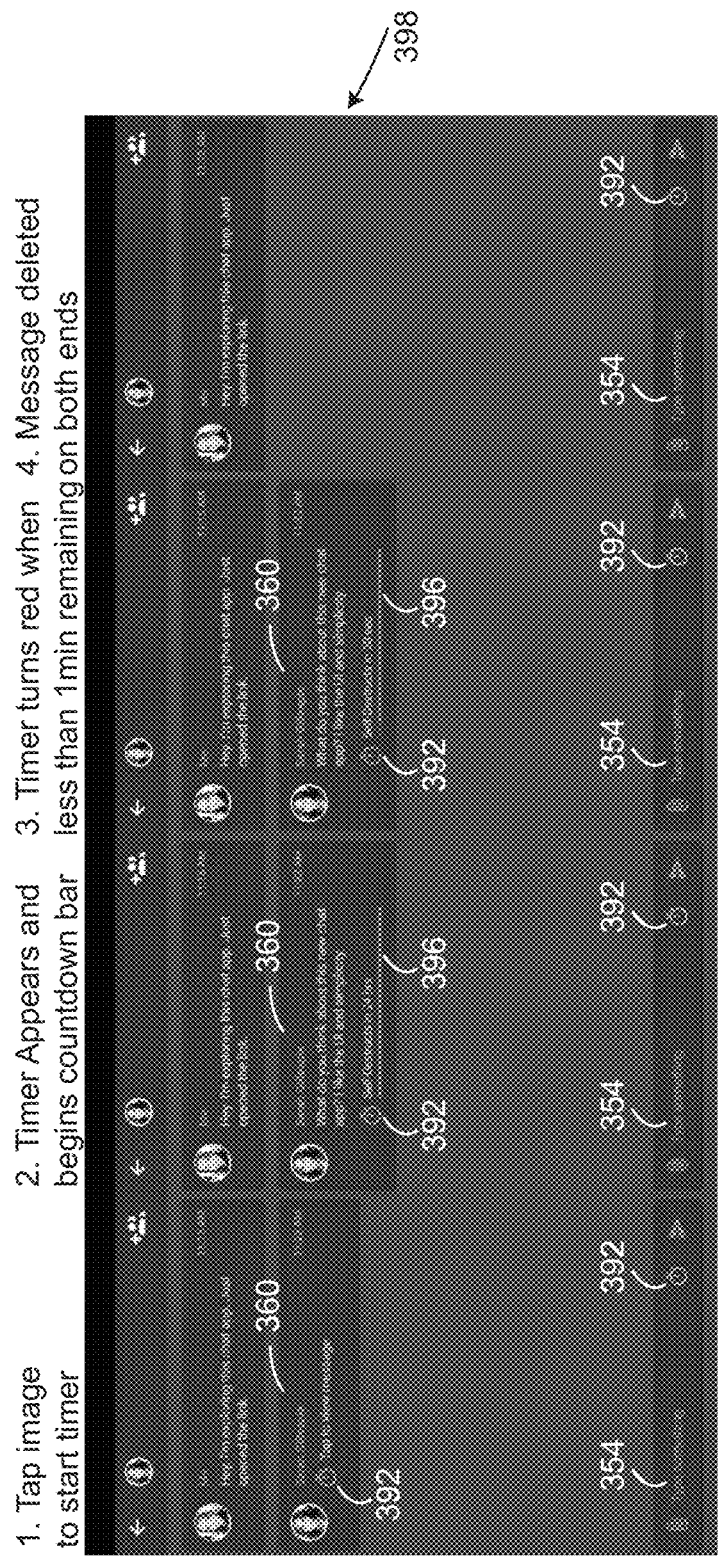

In FIG. 18, the application module 108 can provide a self-destruct option for limited a time of accessibility of the chat messages 360. The field 354 for typing the chat message can display a timer icon 392. When the timer icon 392 is tapped/clicked, the application module 108 can display a timer interface 394, e.g., in the form of a slider bar or other time of timer interface 394. The timer interface 394 can allow the destruct time period to be set, e.g., from one minute to twenty-four hours, or other determined time intervals. Once the destruct time is selected using the timer interface 394 and the message 360 is entered and determined to be sent, the application module 108 can display the encrypting indicator 364 while the message 360 is being encrypted. The sent message 360 can show the timer icon 392 to the message sender and receiver. In FIG. 19, when the receiver receives the message 360, e.g., on the other device 110*a-n*, the application module 108 provides viewing of the message 360 by a tap of the message. The message 360 indicates the timer icon 392, and the time remaining to message destruction icon 396. The application module 108 begins to count down the time remaining when the message 360 is opened. The initial time remaining is based on the time set by the timer interface 394 by the sender. The time remaining to destruction icon 396 can indicate when there is less than a determined time remaining, e.g., one minute or less, by blinking and/or changing color, etc. After the view time has elapsed the application module 108 deletes the message 360 for both the sender and the receiver(s). Therefore, the devices 106 and 110*a-n* can no longer display the chat message 360 (398).

Figure 20:
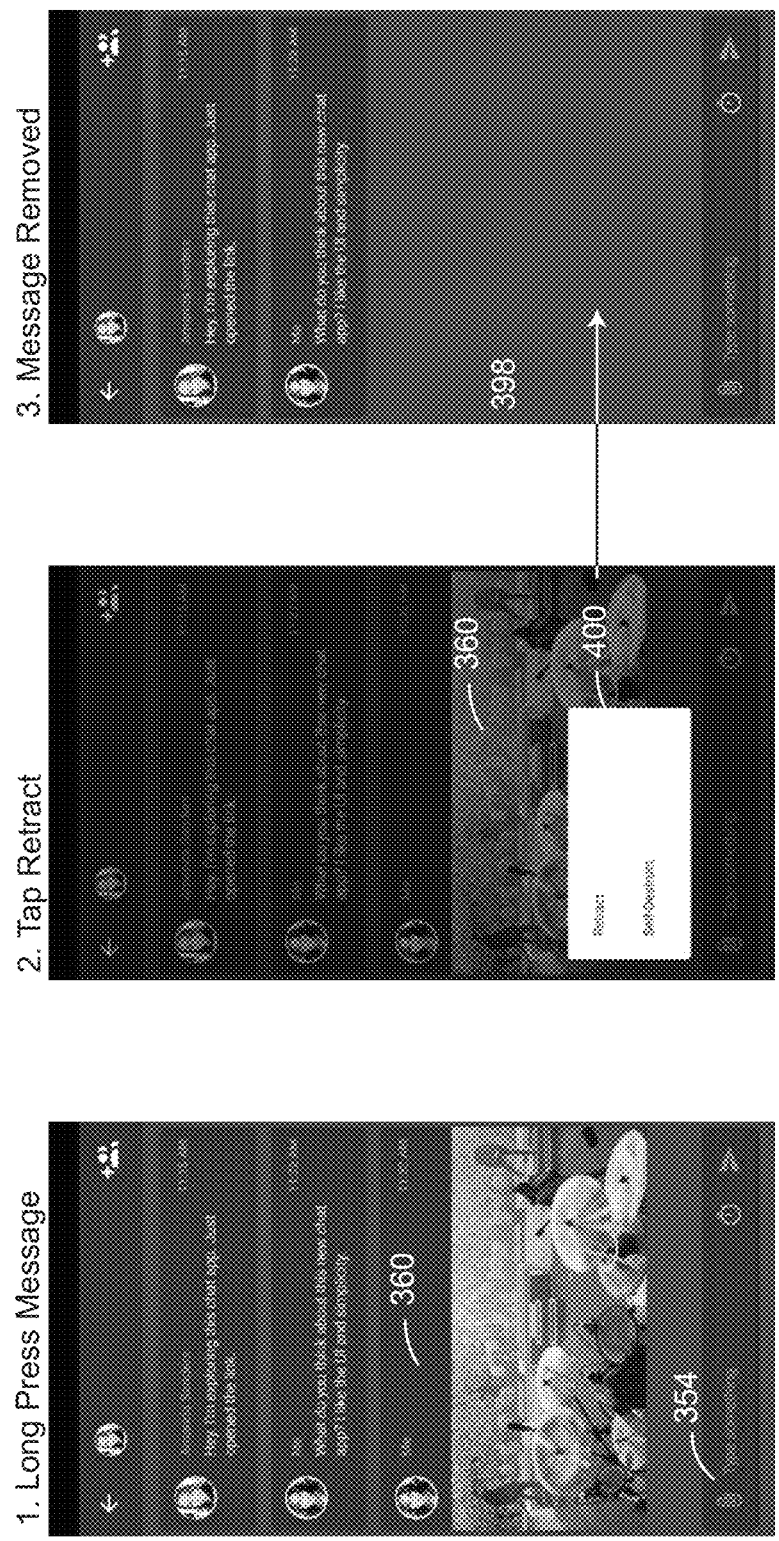
Figure 21:
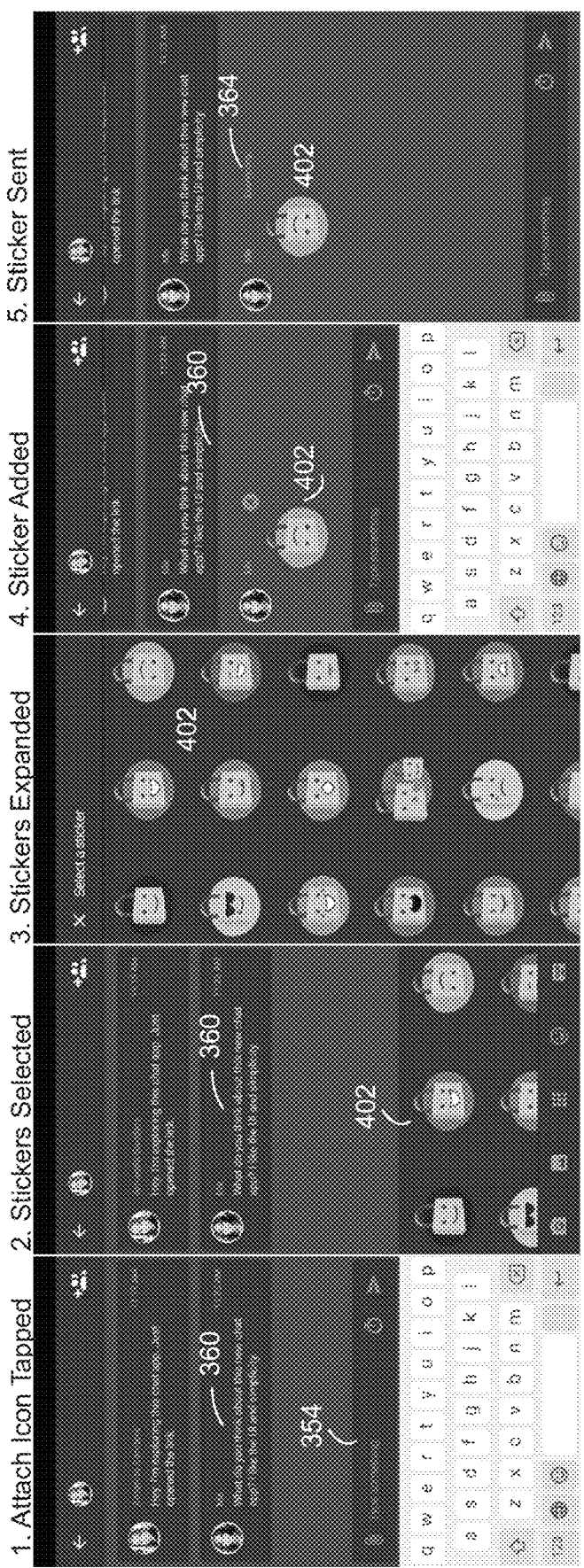

In FIG. 20, the application module 108 allows the chat messages 360 to be simultaneously deleted on both the sender and receiver devices 106 and 110a-n. In some embodiments, when receiving a long press on the chat message 360, the application module 108 displays a delete message confirmation box 400, requesting confirmation to delete the message or cancel the deletion. Upon confirmation, the application module 108 deletes the chat messages 360 on both the sender and receiver(s) devices 106 and 110a-n (398). In FIG. 21, the application module 108 can provide stickers 402 to attach to the chat messages 360. The stickers 402 can add life and emotion to the chat sessions. The application module 108 provides that the sticker 402 can be selected from a plurality of sticker images and attached to the chat message 360. The application module 108 encrypts the chat message 360 with the sticker 402 before sending the message 360 from the sender device 106 to the receiver device 110a-n.

For multi-device synchronization of a single account with a complete chat thread history, e.g., multiple message threads with various user devices, the application module 108 can synchronize the chat history across all the devices 106 for which the account is registered with the master password for the user on those devices 106. In some embodiments, the data stored in the vault 104 for the client device 106 is synchronized across any number of user account devices 106. An advantage is that the number of synchronized devices 106 is not limited as with other messaging applications. In some embodiments, the application module 108 provides a platform and device-wide architecture, e.g., to operate on smartphones, tablets and computer, and across various operating systems, including by not limited to, IOS, ANDROID, WINDOWS, e.g., phones and SURFACE, BLACKBERRY, KINDLE, NOOK, MAC, PC, etc. In some embodiments, the device 106 can select customizable themes with different colors and patterns.

In some embodiments, the device 106 can auto-logout the application module 108 after a determined time period of inactivity, for protection of data stored in the vault 104. The application module 108 can be used set an auto-logout timer in the settings screen of the application module 108 to protect an integrity of the data in the event the user steps away from the device 106. In some examples, this protects the vault 104 in not leaving it exposed to an outside threat. In some embodiments, the device 106 can self-destruct messages upon a determined time-out period being reached. The device 106 can set the self-destruct timer on all chat messages 360 stored in the vault 104, or can set a timer on individual chat messages 360 to a recipient and/or to individual recipients. Once the recipient opens the chat messages 360, the timer starts. Once the time counts down to zero, the chat message 360 is permanently eliminated from both the sender's and receiver's devices.

In some embodiments, the application module 108 can provide device-to-device voice calling, e.g., private voice calls that can include voice and video calls. In some embodiments, the application module 108 can be configured to record voicemail messages inside the vault 104 in the event they miss a voice call. In some embodiments, the application module 108 can provide group chats, e.g., the application module 108 can set up and execute private and secure group chats with other devices that include the application module 108. In some embodiments, the application module 108 can attach images from a camera roll to the messages. When images are selected from the device's 106 camera roll, they are encrypted and uploaded into the device's vault and stored inside an image gallery inside the vault. In some embodiments, the images taken from the application module 108 using the camera of the device 106 are not saved on the camera roll of the device 106 for security purposes. The device 106 can be configured to take photos and videos, and attach them to the messages, directly via the vault. The images and video files do not reside, nor are they stored, on the device's camera roll. In some embodiments, all images, videos and files are stored in the vault 104. The images and video are fully encrypted at rest and in transit, for backup protection in the vault 104, and when used for syncing across multiple devices 106, e.g., smartphone, computer, tablet, etc.

In some embodiments, devices 106 that have both a password account and a chat account with the service provider can toggle between the vault for the password account and the vault for the chat account. The device 106 can also deep link with other application module 108 users, when engaged in a message thread, into a password vault record. The login credentials for both the password vault and the chat vault can be the same for the device 106. If the device 106 creates a password management vault first, onboarding the device 106 into the messaging chat can be simple since they use the same master password or biometric 240 to login.

Figure 22:
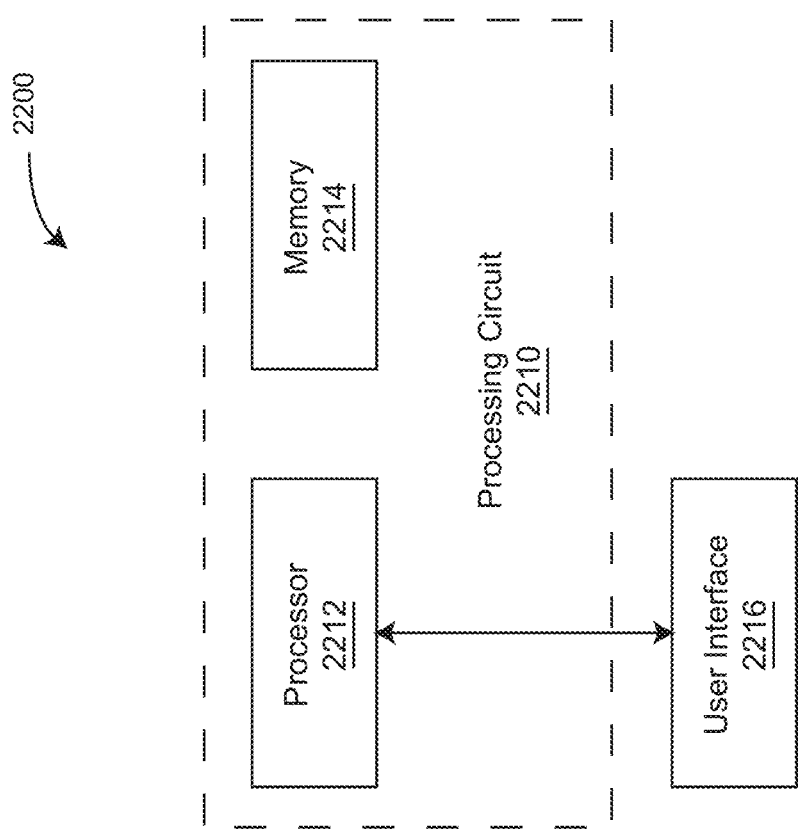
FIG. 22 is a block diagram of an example processing module.

FIG. 22 is a block diagram of an example processing module 2200 of the device 106. The systems and methods described above may be implemented in many different ways in many different combinations of hardware, software firmware, or any combination thereof. In one example, the processing module 2200 may enable functions of the application module 108 of the device 106. It can be appreciated that the components, devices or elements illustrated in and described with respect to FIG. 22 below may not be mandatory and thus some may be omitted in certain embodiments. Additionally, some embodiments may include further or different components, devices or elements beyond those illustrated in and described with respect to FIG. 22.

In some example embodiments, the processing module 2200 may include processing circuitry 2210 that is configurable to perform actions in accordance with one or more example embodiments disclosed herein. In some examples the processing circuitry 2210 includes the microcontroller 140 or other processor. The processing circuitry 2210 may be configured to perform and/or control performance of one or more functionalities of the device 106. The processing circuitry 2210 may be configured to perform data processing, application execution and/or other processing and management services according to one or more example embodiments. In some embodiments, the processing module 2200 or a portion(s) or component(s) thereof, such as the processing circuitry 2210, may include one or more chipsets and/or other components that may be provided by integrated circuits.

In some example embodiments, the processing circuitry 2210 may include a processor 2212 and, in some embodiments, such as that illustrated in FIG. 22, may further include memory 2214. The processor 2212 may be embodied in a variety of forms. For example, the processor 2212 may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it can be appreciated that the processor 2212 may include a plurality of processors. The plurality of processors may be in operative communication with each other and may be collectively configured to perform one or more functionalities of the processing module 2200 as described herein. In some example embodiments, the processor 2212 may be configured to execute instructions that may be stored in the memory 2214 or that may be otherwise accessible to the processor 2212. As such, whether configured by hardware or by a combination of hardware and software, the processor 2212 is capable of performing operations according to various embodiments while configured accordingly.

In some example embodiments, the memory 2214 may include one or more memory devices. Memory 2214 may include fixed and/or removable memory devices. In some embodiments, the memory 2214 may provide a non-transitory computer-readable storage medium that may store computer program instructions that may be executed by the processor 2212. In this regard, the memory 2214 may be configured to store information, data, applications, instructions and/or the like for enabling the processing module 2200 to carry out various functions in accordance with one or more example embodiments. In some embodiments, the memory 2214 may be in communication with one or more of the processor 2212, the user interface 2216 for passing information among components of the processing module 2200. The user interface 2216 can include one or more of a keyboard, a keypad, a mouse, a trackball, a touchscreen, a stylus, etc.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A computer-implemented method for facilitating secured chat messaging between a application module corresponding to a first user and a second application module corresponding to a second user on the first application module, the method comprising:
    deriving a master password-based encryption key from a master password;
    generating a data key;
    encrypting the data key with the master password-based encryption key;
    sending the encrypted data key to a first service provider vault corresponding to the first user;
    generating a first key pair comprising a first public key and a first private key corresponding to the first user;
    storing the first public key in the service provider vault without encryption for the second application module to receive from the service provider vault;
    generating a record key;
    encrypting chat messages of a chat thread using the record key;
    (e) encrypting, by the application module, the record key with the data key;
    decrypting the chat messages in the chat thread with the record key for display on the first client device;
    receiving a second public key from the second client device;
    encrypting the record key using the second public key; and
    synchronizing the encrypted record key and encrypted chat messages in the chat thread with a second service provider vault corresponding to the second user, where the encrypted record key is accessed by a second application module corresponding to the second user, and decrypted using a second private key in a second key pair corresponding to the second user for decryption of the chat messages in the chat thread by the second application module.

2. The computer-implemented method of claim 1, where the first application module executes on a first client device.

3. The computer-implemented method of claim 1, wherein the master password synchronizes chat messages across various devices.

4. The computer-implemented method of claim 1, further comprising simultaneously deleting by the application module the chat thread on a sender device and receiver device.

5. The computer-implemented method of claim 1, further comprising self-destructing a chat message of the chat thread by the application module after a determined time period has elapsed after viewing the chat message.

6. The computer-implemented method of claim 5, further comprising displaying a time remaining to self-destruction.

7. The computer-implemented method of claim 1, further comprising decrypting by the application module a private key paired with the public key.

8. The computer-implemented method of claim 1, further comprising:
    receiving by the application module a public key from another device to add to the chat thread; and
    encrypting by the application module the record key with the public key.

9. The computer-implemented method of claim 1, where a complete chat thread is displayed across multiple devices including a same master password for the service provider.

10. The computer-implemented method of claim 1, where the master password-based encryption key is derived with a password strengthening algorithm.

11. The computer-implemented method of claim 10, further comprising generating a client key, where the client key encrypts data stored local to a client device corresponding to the first user.

12. The computer-implemented method of claim 1, further including providing a display for the client device, the display configured to display decrypted chat messages.

13. The computer-implemented method of claim 1, wherein the application module is configured to self-destruct the chat messages after a determined time period for both a sending client device and a receiving client device.

14. The computer-implemented method of claim 1, wherein the other client device re-encrypts the record key with a data key of the other client device.

15. The computer-implemented method of claim 1, wherein a complete chat thread is displayed across multiple devices including a same master password for the service provider.

16. A computer-implemented method for facilitating secured chat messaging between a first application module corresponding to a first user and a second application module corresponding to a second user on the first application module, the method comprising:
    deriving a master password-based encryption key from a master password;
    generating a data key;
    encrypting the data key with the master password-based encryption key;
    sending the encrypted data key to a first service provider vault corresponding to the first user;
    generating a first key pair comprising a first public key and a first private key corresponding to the first user;
    storing the first public key in the first service provider vault without encryption for the second client device to receive from the first service provider vault;

receiving request to connect to a chat thread from a second application module corresponding to the second user where the second application module accesses the first public key corresponding to the first user from the first service provider vault and encrypts a record key for encrypting chat messages of a chat thread using the first public key;

decrypting the first private key using the data key;

decrypting the encrypted record key using the first private key;

decrypting the chat messages in the chat thread using the record key; and sending the decrypted chat messages for display by the second application module corresponding to the second user.

17. The computer-implemented method of claim 16, further comprising re-encrypting the record key with the data key to improve speed and performance.

* * * * *